United States Patent
Faulstich et al.

(10) Patent No.: US 8,062,611 B2
(45) Date of Patent: Nov. 22, 2011

(54) FLUID PROCESSING DEVICE INCLUDING COMPOSITE MATERIAL FLOW MODULATOR

(75) Inventors: Konrad Faulstich, Fremont, CA (US); Aldrich N. K. Lau, Palo Alto, CA (US); Debjyoti Banerjee, College Station, TX (US); Umberto Ulmanella, Foster City, CA (US); Jun Xie, Pasadena, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 1106 days.

(21) Appl. No.: 11/252,915

(22) Filed: Oct. 18, 2005

(65) Prior Publication Data

US 2006/0093526 A1    May 4, 2006

Related U.S. Application Data

(60) Provisional application No. 60/619,731, filed on Oct. 18, 2004, provisional application No. 60/619,677, filed on Oct. 18, 2004, provisional application No. 60/619,623, filed on Oct. 18, 2004.

(51) Int. Cl.
  *B01L 3/00* (2006.01)

(52) U.S. Cl. ........ 422/537; 422/501; 422/502; 422/503; 422/551; 422/552; 422/553; 436/180; 436/288.3; 436/288.5

(58) Field of Classification Search .................. 422/100, 422/501, 502, 537, 551–553; 436/180, 288.3; 436/288.5
  See application file for complete search history.

(56) References Cited

U.S. PATENT DOCUMENTS

| | | | |
|---|---|---|---|
| 4,522,923 A * | 6/1985 | Deutsch et al. ............... 436/536 |
| 4,800,066 A * | 1/1989 | Sinclair et al. ................ 422/55 |
| 5,798,215 A | 8/1998 | Cathey et al. |
| 5,846,396 A | 12/1998 | Zanzucchi et al. |
| 6,030,581 A | 2/2000 | Virtanen |
| 6,102,897 A | 8/2000 | Lang |
| 6,152,181 A | 11/2000 | Wapner et al. |
| 6,302,134 B1 | 10/2001 | Kellogg et al. |
| 6,375,901 B1 | 4/2002 | Robotti et al. |
| 6,615,855 B2 | 9/2003 | Lopez et al. |
| 6,755,621 B2 | 6/2004 | Lopez et al. |
| 2002/0054835 A1 | 5/2002 | Robotti et al. |
| 2002/0121487 A1 | 9/2002 | Robotti et al. |

(Continued)

FOREIGN PATENT DOCUMENTS

KR    040075217    11/2004

(Continued)

OTHER PUBLICATIONS

Svec, "Porous Monoliths:The Newest Generation ofStationary Phases for HPLC and Related Methods" Recent Developments in LC Column Technology Jun. 2003.*

(Continued)

*Primary Examiner* — Jill Warden
*Assistant Examiner* — Shogo Sasaki

(57) ABSTRACT

A fluid processing device is provided that includes a substrate, a plurality of fluid retainment regions formed in or on the substrate, and a barrier at least partially separating two or more of the fluid retainment regions. The barrier includes a mixture of a sequestering material and a reaction component. The reaction component can be at least one of a reactant, a reagent, a catalyst, an initiator, a promoter, a cofactor, an enzyme, a salt, or a combination thereof. The sequestering material can be a porous material, a dissolvable material, or both.

9 Claims, 27 Drawing Sheets

U.S. PATENT DOCUMENTS

| | | | |
|---|---|---|---|
| 2002/0143437 A1 | 10/2002 | Handique et al. | |
| 2002/0153251 A1 | 10/2002 | Sassi et al. | |
| 2002/0194909 A1 | 12/2002 | Hasselbrink, Jr. et al. | |
| 2003/0019522 A1 | 1/2003 | Parunak | |
| 2003/0210997 A1 | 11/2003 | Lopes et al. | |
| 2004/0043507 A1 | 3/2004 | Song et al. | |
| 2004/0067168 A1 | 4/2004 | Buffiere et al. | |
| 2004/0089616 A1 | 5/2004 | Kellogg et al. | |
| 2006/0090800 A1* | 5/2006 | Banerjee et al. | 137/827 |
| 2006/0093528 A1* | 5/2006 | Banerjee et al. | 422/103 |
| 2010/0133104 A1* | 6/2010 | Banerjee et al. | 204/450 |
| 2010/0136701 A1* | 6/2010 | Banerjee et al. | 436/94 |
| 2011/0114206 A1 | 5/2011 | Banerjee et al. | |
| 2011/0126913 A1 | 6/2011 | Banerjee et al. | |

FOREIGN PATENT DOCUMENTS

| | | |
|---|---|---|
| WO | WO-98/38510 | 9/1998 |
| WO | WO-99/06149 | 2/1999 |
| WO | WO-99/44740 | 9/1999 |
| WO | WO 02075312 A1 * | 9/2002 |
| WO | WO-02/088296 | 11/2002 |
| WO | WO 03024598 A1 * | 3/2003 |
| WO | WO 03093802 A1 * | 11/2003 |
| WO | WO 2004067444 A1 * | 8/2004 |
| WO | WO 2004083109 A1 * | 9/2004 |

OTHER PUBLICATIONS

Notification of Transmittal dated May 3, 2007, from PCT Application No. PCT/US2005/037451.

International Preliminary Report on Patentability dated Apr. 24, 2007, from PCT Application No. PCT/US2005/037451.

Written Opinion of International Searching Authority dated May 8, 2007, from PCT Application No. PCT/US2005/037451.

Notification of Transmittal dated Oct. 16, 2006, from PCT Application No. PCT/US05/37342.

Wntten Opinion of International Searching Authority dated Oct. 16, 2008, from PCT Application No. PCT/US05/37342.

International Search Report dated Oct. 16, 2006, from PCT Application No. PCT/US05/37342.

Iwata et al., Atomic Force Microscopic Analysis of a Porous Membrane with pH-Sensitive Molecular Valves, *Macromolecules*, 31, 3671-3678. (1998).

Beebe et al., Functional Hydrogel Structures for Autonomous Flow Control Inside Microfluidic Channels, *Nature*, vol. 404, 588-590, Apr. 6, 2000.

EP 05808640.6, "EP Search Report mailed Jul. 31, 2009", 7 pgs.

EP 05808640.6, "Office Action mailed Nov. 6, 2009", 2 pgs.

EP 05809896.3, "Office Action mailed on Dec. 3, 2009", 2 pgs.

EP 05808694.3, "Office Action mailed on Nov. 19, 2009", 2 pgs.

EP 05809896.3, "Extended European Search Report mailed Aug. 25, 2009", 3 pgs.

U.S. Appl. No. 12/945,793 Office Action dated Mar. 21, 2011, 7 pgs.

U.S. Appl. No. 12/954,519 Office Action dated Mar. 7, 2011, 2 pgs.

U.S. Appl. No. 12/954,519 Office Action dated Apr. 29, 2011, 10 pgs.

* cited by examiner

FLUID PROCESSING DEVICE INCLUDING COMPOSITE MATERIAL FLOW MODULATOR

CROSS-REFERENCE TO RELATED APPLICATIONS

This application claims benefit under 35 U.S.C. Section 119(e) from earlier U.S. Provisional Patent Applications Nos. 60/619,731, 60/619,677, and 60/619,623, all of which were filed Oct. 18, 2004, and all of which are incorporated herein in their entireties by reference.

INTRODUCTION

Undesired reactions can occur when mixing reaction components under less than ideal conditions, for example, mixing reagents for a polymerase chain reaction (PCR) at room temperature. For reactions to be carried out under conditions where space constraints require several reagents to be stored in the same chamber or in close proximity to one another, problems can arise if the reagents react with one another prior to a desired reaction time, temperature, or other condition. Even dry formulations are often limited by the hygroscopic nature of the reactants included in the formulations, causing limited shelf lives.

SUMMARY

According to various embodiments, a fluid processing device is provided that can comprise a substrate, a plurality of fluid retainment regions, and a composite material barrier. The plurality of fluid retainment regions can be formed in or on the substrate and can include at least a first fluid retainment region and a second fluid retainment region. The composite material barrier can at least partially separate the first fluid retainment region from the second fluid retainment region. The composite material barrier can comprise a mixture of at least a first component and a second component, wherein the first component comprises a sequestering material and the second component comprises one or more reaction components for a desired reaction. Herein, by "reaction component" what is meant is at least one of a reactant, a reagent, a catalyst, an initiator, a promoter, a cofactor, an enzyme, a salt, a buffering agent, a chelating agent, or a combination thereof. The first component can comprise one or more of, for example, a ceramic, a ceramic composite, glass fibers (for example, a glass fiber ball or disk), fritted glass (for example, a disc or column), a porous scaffold material or matrix, for example, a non-biodegradable porous polymer monolith.

According to various embodiments, the sequestering material can partially, or fully, encapsulate the reaction component. The reaction component can be uniformly dispersed throughout the sequestering material or it can be concentrated in one or more regions or portions of the sequestering material, for example, in an end region or central portion of a mass of sequestering material.

According to various embodiments, the barrier can be ring-shaped, square-shaped, star-shaped, or any other shape. The barrier can comprise, for example, an outer wall having the shape of a polygon. The barrier can be a plug. The barrier can comprise a fluid flow modulator arranged in a fluid processing passageway and adapted to open to form, or to increase in size, a fluid communication between at least two fluid retainment regions. The barrier can be a dissolvable composite material valve that, upon at least partial dissolution, can release a sequestered or composited reaction component into a fluid retainment region or into a fluid reaction pathway.

The barrier can separate a first reagent for a reaction, retained in the first fluid retainment region, from a second reagent for the same reaction, retained in the second fluid retainment region. The first and second reagents can be the same as or can differ from one another.

According to various embodiments, the fluid processing device can further comprise at least one additional fluid retainment region, at least one fluid processing passageway, and at least one actuatable valve arranged in the at least one fluid processing passageway. The fluid processing passageway, or each fluid processing passageway if there is more than one, can be in fluid communication with the at least one additional fluid retainment region and at least one other fluid retainment region. The actuatable valve can include a pressure-actuatable valve, for example, comprising a frangible diaphragm, or a heat-actuatable valve, for example, comprising at least one material selected from a rubber, a plastic, a wax, a paraffin, a polyethylene glycol material, a derivative of a polyethylene glycol, and a polysaccharide.

According to various embodiments, the barrier can comprise a mixture of a porous material that is insoluble in a first liquid, and one or more reaction components that are dissolvable in the first liquid. For example, the first component can comprise a water-insoluble porous sequestering material and the second component can comprise a water-soluble reaction component that dissolves when contacted with water at room temperature. The first component can comprise a porous ceramic material. The first component can comprise a porous scaffold material. The first component can comprise a biodegradable polymer scaffold material. The first component can comprise a chitosan-gelatin scaffold material. The first component can comprise a water-insoluble cellulose derivative.

According to various embodiments, a method is provided for processing a fluid. The method can comprise contacting a barrier that includes a dissolvable reaction component, with a first liquid in which the reaction component is dissolvable. The barrier can also include a sequestering material that can be soluble in the first liquid, or insoluble in the first liquid.

The method can comprise contacting a barrier that includes a dissolvable sequestering material, with a first liquid in which the sequestering material is dissolvable. The method can comprise dissolving the sequestering material such that a sequestered or composited reaction component is released from the sequestering material and into the first liquid. The method can further comprise dissolving the sequestering material of the barrier to form a fluid communication between a first fluid retainment and a second fluid retainment region.

According to various embodiments, the method can comprise releasing a reaction component from a barrier that comprises a mixture of at least a porous material that is insoluble in a first liquid, and a reaction component selected from at least one of a reactant, a reagent, a catalyst, an initiator, a promoter, a cofactor, an enzyme, or a combination thereof. The method can include contacting the barrier with the first liquid such that the reaction component is released into the first liquid. The reaction component can be dissolvable or insoluble in the first liquid. The barrier can comprise a flow modulator or valve disposed along a fluid communication between two or more fluid retainment regions. The method can include flowing a fluid through a fluid communication that had previously been interrupted by the barrier, and mixing together two reagents that had been separated by the barrier.

According to various embodiments, a method is provided whereby a barrier comprising a dissolvable salt is contacted with a liquid such that the salt is dissolved and released into the liquid. The salt can be an exothermic or endothermic salt and can change the temperature of the liquid upon contact.

According to various embodiments, the device according to the present teachings can comprise at least one fluid retainment region.

According to various embodiments, the device according to the present teachings can comprise at least two fluid retainment regions.

According to various embodiments, the device according to the present teachings can comprise a sample retainment region, a reaction retainment region, at least one intermediate retainment region, and at least one reaction component retainment region. The retainment regions can be interconnected by at least one fluid processing passageway.

According to various embodiments, the device according to the present teachings can further comprise at least one waste retainment region.

According to various embodiments, the device according to the present teachings can comprise a sample retainment region, a reaction retainment region, a first intermediate retainment region, a second intermediate retainment region, a first reaction component retainment region, and a second reaction component retainment region. The retainment regions can be interconnected by at least one fluid processing passageway.

According to various embodiments, the device according to the present teachings can further comprise a first waste retainment region and a second waste retainment region.

According to various embodiments, the device can further comprise one or more fluid processing passageways interconnecting the retainment regions.

According to various embodiments, the device can comprise a pressure-actuated valve provided in a fluid processing passageway. The fluid processing passageway comprising a pressure-actuated valve can be provided between a reaction component retainment region and an intermediate retainment region such that upon actuation of the valve, the direction of flow is from the reaction component retainment region to the intermediate retainment region.

According to various embodiments, the device can comprise a dissolvable valve provided in a fluid processing passageway. The fluid processing passageway comprising the dissolvable valve can be provided between the intermediate retainment region and the reaction retainment region such that the direction of flow is from the intermediate retainment region to the reaction retainment region. The dissolvable valve can provide automatic control of the fluid communication between the intermediate and reaction retainment regions. Flow can further be controlled by varying the cross-sectional area of the fluid processing passageway comprising a dissolvable valve.

According to various embodiments, the device can comprise a fluid processing passageway where fluid communication is controlled by both the cross-sectional area of the fluid processing passageway. The cross-sectional controlled fluid processing passageway can be provided between the intermediate retainment region and the reaction retainment region such that the direction of flow is from the intermediate retainment region to the reaction retainment region. The cross-sectional controlled fluid processing passageway can be provided between the sample retainment region and the reaction retainment region. Flow can further be controlled by further providing the cross-sectional controlled fluid processing passageway with a dissolvable valve.

According to various embodiments, the device according to the present teachings can comprise a capillary fluid processing passageway interconnecting a sample retainment region and a reaction retainment region such that the direction of flow is from the sample retainment region to the reaction retainment region.

According to various embodiments, the device according to the present teachings can comprise a capillary fluid processing passageway interconnecting a reaction retainment region and a waste retainment region such that the direction of flow is from the reaction retainment region to the waste retainment region.

According to various embodiments, the device can comprise a dissolvable valve provided in a fluid processing passageway. The fluid processing passageway comprising the dissolvable valve can be provided between the reaction retainment region and the waste retainment region such that the direction of flow is from the reaction retainment region to the waste retainment region.

According to various embodiments, the fluid processing passageway comprising a dissolvable valve can be provided between the sample retainment region and the reaction retainment region, such that the direction of flow is from the sample retainment region to the reaction retainment region.

According to various embodiments, one or more fluid processing passageways comprising one or more dissolvable valves provided between at least two retainment regions, can comprise one or more discrete fluid processing passageways, or can comprise a single, continuous fluid processing passageway. The single, continuous fluid processing passageway can comprise a single, extended dissolvable valve, for example a single, extended length of dissolvable valve material.

According to various embodiments, the device according to the present teachings, can comprise one or more retainment regions prefilled with one or more one reaction components.

It is to be understood that both the foregoing general description and the following detailed description are exemplary and explanatory only and are intended to provide a further explanation of the present teachings, as claimed.

DRAWINGS

Various embodiments of the present teachings are exemplified in the accompanying drawings. The teachings are not limited to the embodiments depicted in the drawings, and include equivalent structures and methods, as set forth in the following description and as would be known to those of ordinary skill in the art in view of the present teachings.

FIGS. 1(*a*), 1(*b*), and 1(*c*) schematically illustrate various stages in the operation of a valve according to various embodiments.

FIGS. 4A-4J schematically illustrate various stages in the operation of a diagnostic device according to an embodiment.

FIGS. 5A-5J schematically illustrate various stages in the operation of a diagnostic device according to an embodiment.

Figure 6:
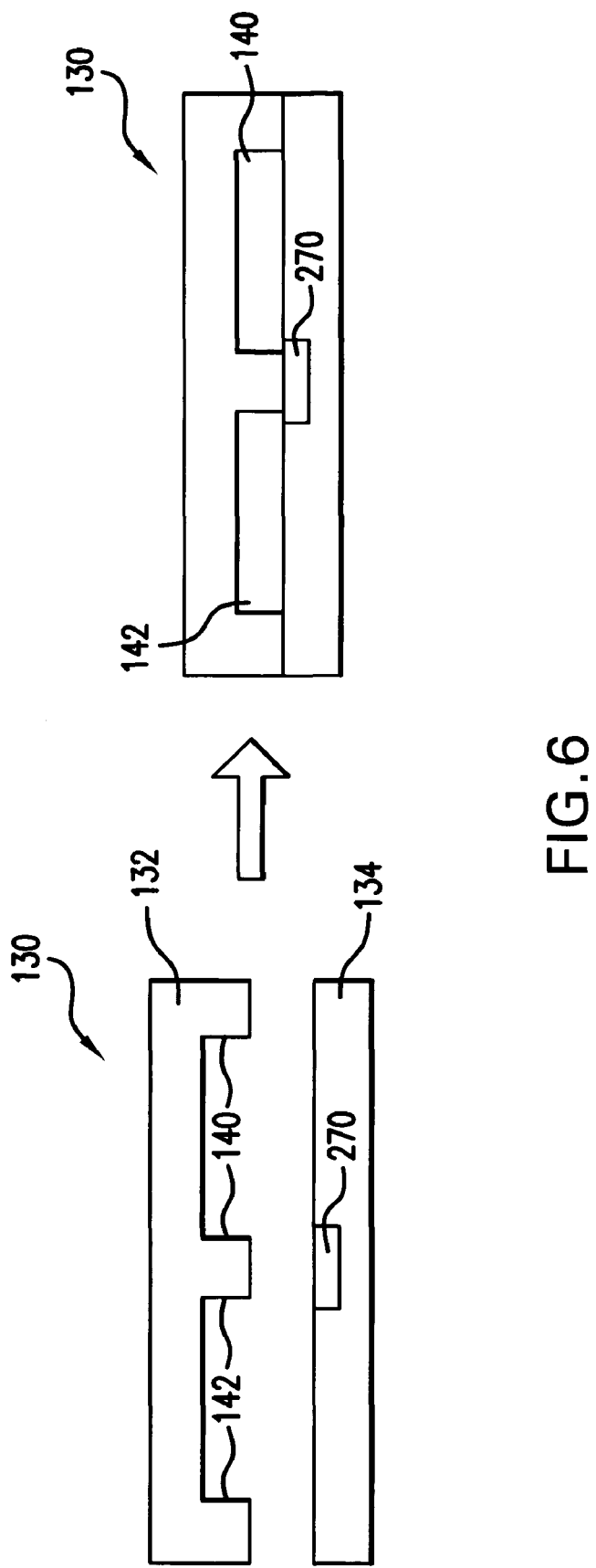

FIG. 6 illustrates the assembly of a diagnostic device from two separate pieces.

Figure 3:
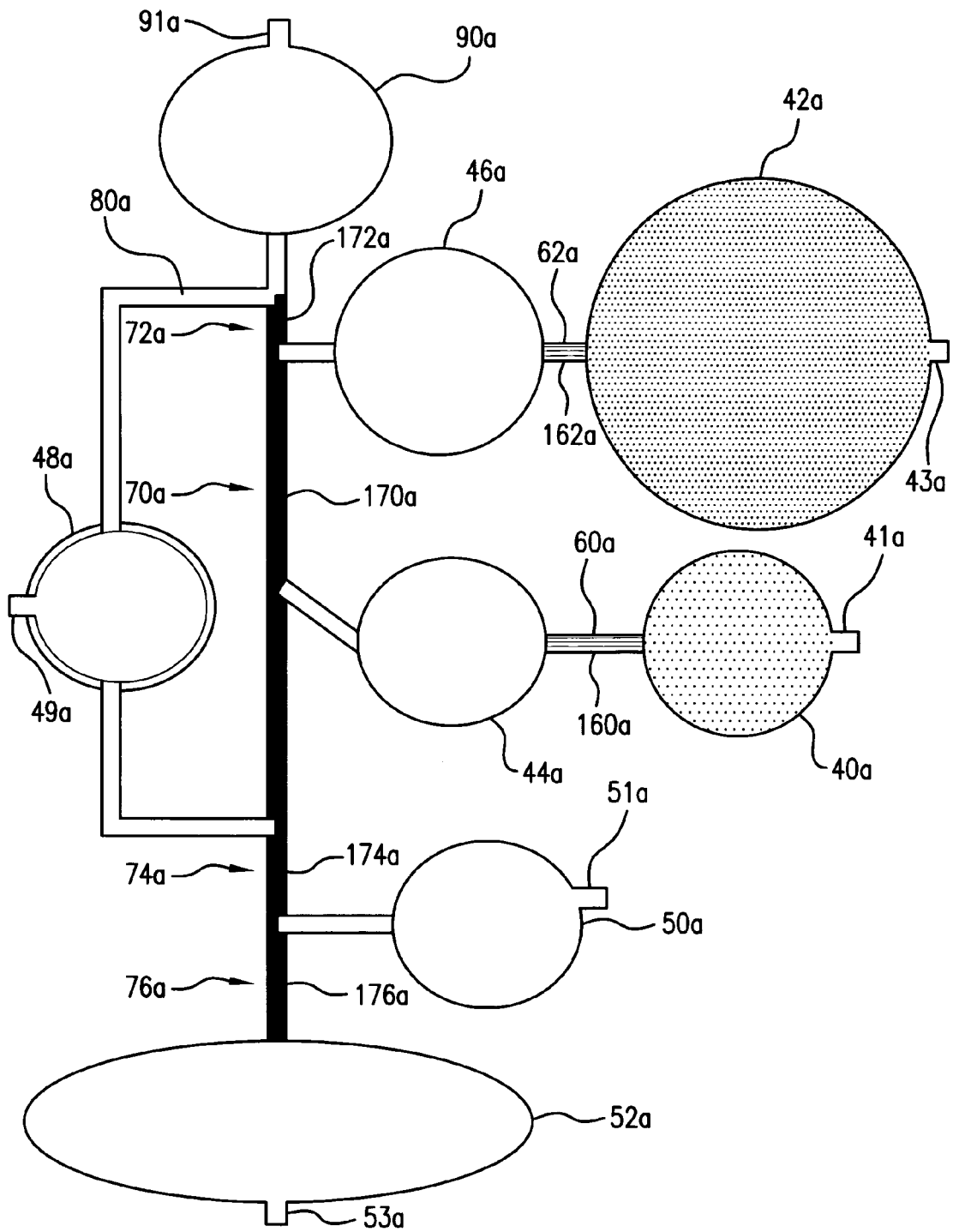
FIG. 3 is a schematic illustration of a diagnostic device according to various embodiments.
Figures 7, 8:
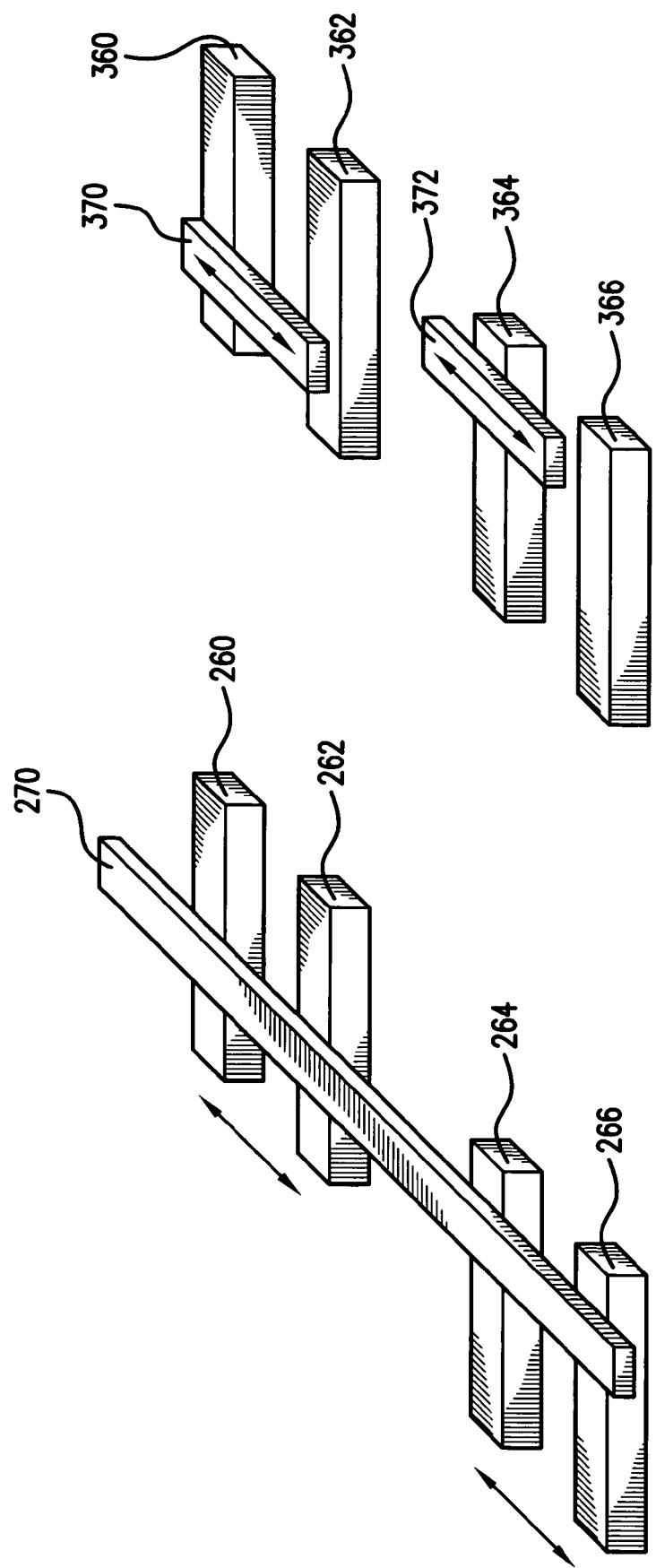

FIG. 7 illustrates the effect of misalignment of the pieces shown in FIG. 6 for an embodiment of the device as shown in FIG. 3.

Figure 2:
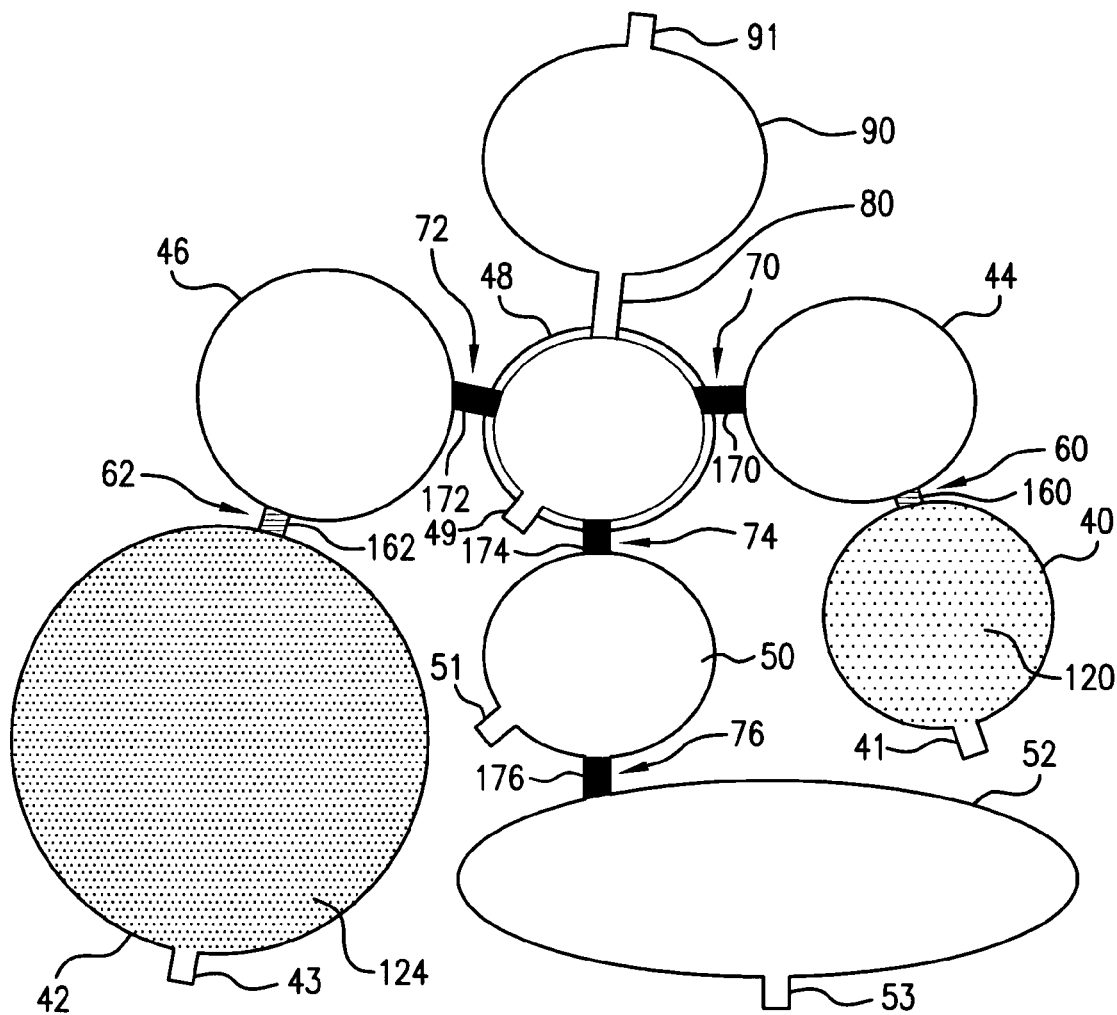
FIG. 2 is a schematic illustration of a diagnostic device according to various embodiments.

FIG. 8 illustrates the effect of misalignment of the pieces shown in FIG. 6 for an embodiment of the device as shown in FIG. 2.

Figure 9:
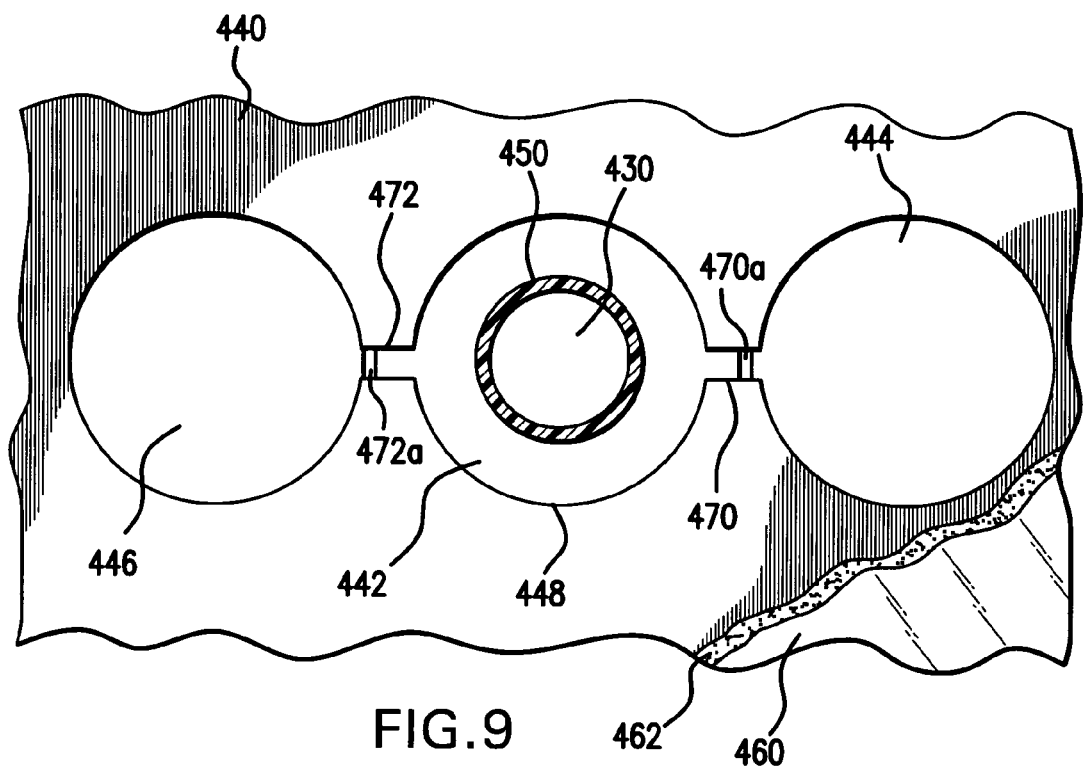

FIG. 9 illustrates an arrangement of retainment regions and a valve according to various embodiments.

Figure 10:
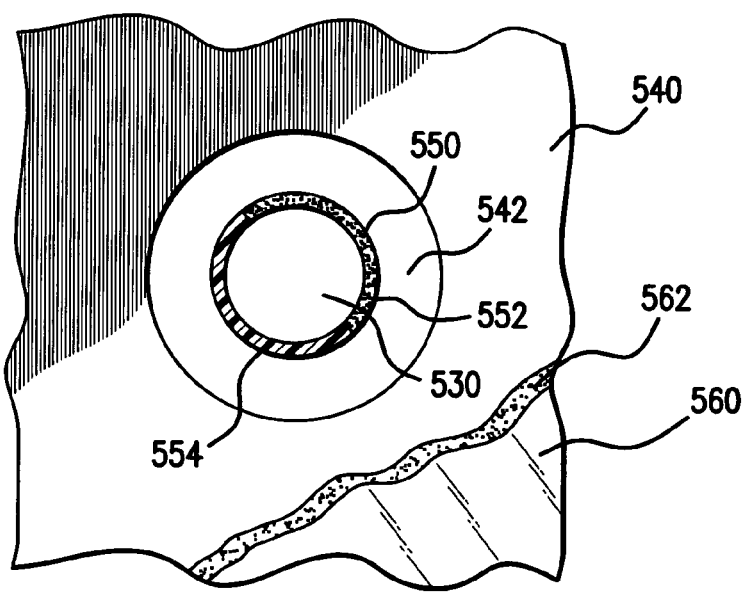

FIG. 10 illustrates an arrangement of retainment regions and a valve according to various embodiments.

Figure 11:
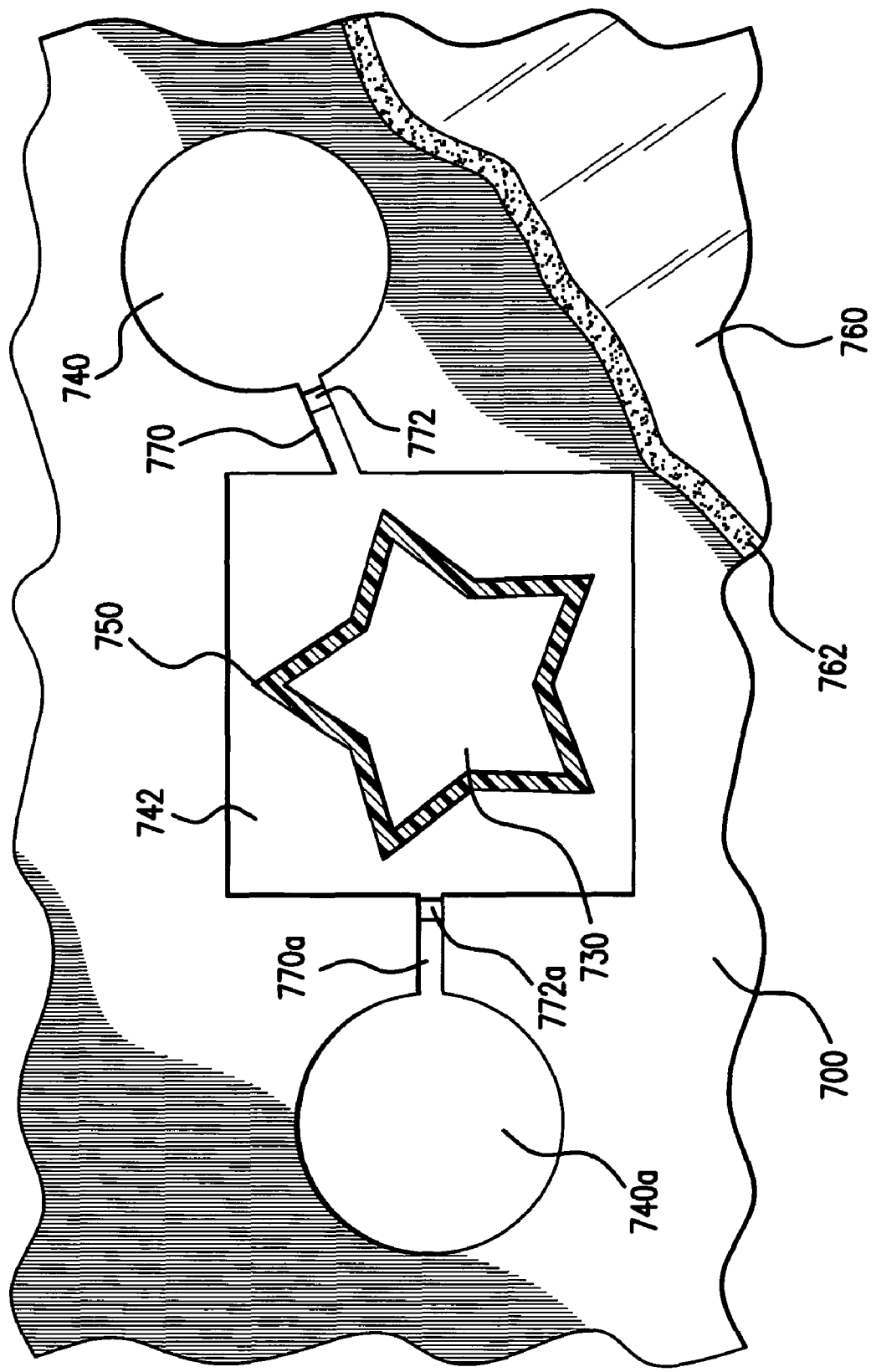

FIG. 11 illustrates an arrangement of retainment regions and a valve according to various embodiments.

It is to be understood that both the foregoing general description and the following detailed description are exemplary and explanatory only and are intended to provide a further explanation of the various embodiments of the present teachings.

DESCRIPTION OF VARIOUS EMBODIMENTS

Definitions: The below definitions serve to provide a clear and consistent understanding of the present teachings.

The term "barrier" means any barrier that can fully separate one retainment region from another retainment region, or that can partially separate one retainment region from another retainment region. The separation can be physical separation.

The barrier can comprise a composite material barrier. The barrier can comprise a fluid flow modulator. The barrier can comprise a dissolvable material, for example, a water-soluble material. The composite material barrier can comprise a mixture of at least a first component and a second component where the first component comprises a sequestering agent and the second component may comprise one or more reaction components for a desired reaction. The fluid flow modulator can comprise a valve and/or a shaped wall. The barrier can comprise a valve. The dissolvable valve can comprise a plug.

The term "solute bridge valve" is used synonymous with the term "dissolvable valve," as herein defined.

The barrier can be a fluid flow modulator disposed in a fluid processing passageway to fully or partially separate a first retainment region from a second retainment region wherein both regions are in fluid communication with the fluid processing passageway.

The dissolvable barrier can comprise a shaped wall that fully or partially separates an outer retainment region from an inner retainment region, where the outer retainment region surrounds the inner retainment region. The shaped wall can comprise dissolvable areas. The shaped wall can comprise both soluble and insoluble areas.

The term "fluid processing passageway" means any area or communication that allows for fluid communication between at least two fluid retainment regions, for example, a channel connecting two regions. One or more fluid processing passageways according to the present teachings can be adapted to provide capillary driven flow. One or more fluid processing passageways according to the present teachings can be adapted to provide electrokinetic driven flow. One or more of the fluid processing passageways according to the present teachings can be adapted to control the rate and timing of fluid flow by varying the dimensions of the fluid processing passageway.

According to some embodiments, the term "capillary flow" means passive flow resulting from a capillary potential gradient or a surface potential gradient, created during device fabrication that can direct the flow of liquid via capillary effect (surface tension).

The terms "a fluid communication," "fluid flow channel," "fluid processing passageway," "flow channel," "flow passageway" "flow control channel," and "flow control passageway," are each used synonymous with the term "fluid processing passageway," as herein described.

The term "fluid flow modulator" means any barrier that modulates the flow of a fluid. The fluid flow modulator can comprise a valve. The fluid flow modulator can comprise a shaped wall. The valve and/or the shaped wall, can comprise a dissolvable material. The fluid flow modulator can comprise a dissolvable valve that can be disposed in a fluid processing passageway in fluid communication with at least two fluid retainment regions. The dissolvable valve can fully or partially block fluid flow through the fluid processing passageway. The dissolvable valve can be adapted to establish fluid communication or to increase the rate of fluid communication, between the at least two fluid retainment regions.

According to various embodiments, the term "fluid" means a gas, an aqueous fluid, a non-aqueous fluid, a vacuum, or a partial vacuum. A gas can comprise, for example, air. For example, where two retainment regions are separated by a fluid flow modulator, one retainment region can comprise, for example, an aqueous or non-aqueous fluid retained therein, while the other retainment region can comprise a gas or a vacuum or partial vacuum, contained therein. In various embodiments, the device can be manufactured to provide a vacuum on one or more sides of a dissolvable valve, for example, to achieve a pressure of from about 0.01 to about 0.99 atm, or from about 0.1 to about 0.5 atm.

The term "plurality" means "two or more." The term "two or more" is used synonymous with the term "plurality," as described herein.

The term "retainment region" means any area that can comprise a reagent or other reaction component for a reaction where the retainment region is in fluid communication with, fully separate from, or partially separate from, another retainment region that can comprise another reagent or reaction component for the reaction that is the same as or different from the first reagent. A first retainment region can be separate from a second retainment region, or a first retainment region can be surrounded by a second retainment region, where the first and second retainment regions are separated by a barrier comprising a shaped-wall.

A retainment region can comprise any area, structure, or form, capable of retaining a volume of fluid. A retainment region can be used, for example, to retain, process, react, store, incubate, transfer, purify, or the like, a fluid sample. A retainment region can comprise a fluid retainment region, a surface area, an area, a recess, a retainment region, a chamber, a depression, a well, a space, or the like. According to some embodiments, a retainment region can comprise, for example, a flat surfaces with hydrophobic regions surrounding hydrophilic loci for receiving, containing, retaining, or binding a sample. A retainment region can comprise any shape, for example, round, teardrop, square, polygon, star, irregular, ovoid, rectangular, or the like. A retainment region or channel can comprise any cross-section configuration, for example, square, round, ovoid, irregular, trapezoid, or the like.

The terms "retainment region," "fluid retainment region," "reservoir," and "region," are used synonymously herein.

The term "reagent for reaction," means one or more reagents or components necessary or desirable for use in one or more reactions or processes, for example, one or more components that in any way affect how a desired reaction can proceed. The reagent for reaction can comprise a reactive component. However, it is not necessary that the reagent participate in the reaction. The reagent for reaction can comprise a non-reactive component. The reagent for reaction can comprise a recoverable component comprising for example, a solvent and/or a catalyst. The reagent for reaction can comprise a promoter, accelerant, or retardant that is not necessary for a reaction but affects the reaction, for example, affects the rate of the reaction. The reagent for reaction can comprise one or more of a solid reagent for reaction and a fluid reagent for reaction. The term "reaction component" is used synonymous with the term "reagent for reaction," as herein defined. The reagent for reaction can comprise one or more of a fluid and a solid. A retainment region can be pre-loaded with one or more reagents for reaction.

The term "vent" means any configuration or structure that relieves vacuum and/or back pressure, or equalizes pressure in a fluid processing device. A vent can comprise a channel or a microchannel. A vent can comprise a non-flow through vent in which gas that is displaced by a fluid can collect. A non-flow through vent can comprise, for example, a hydrophobic vent.

According to various embodiments, suitable reactions or processes can comprise one or more of a sample preparation process, a washing process, a sample purification process, a pre-amplification process, a pre-amplified product purification process, an amplification process, an amplified product purification process, a separation process, a sequencing process, a sequencing product purification process, a labeling process, a detecting process, or the like. Processing components can comprise sample preparation components, purification components, pre-amplification reaction components, amplification reaction components, sequencing reaction components, or the like. The skilled artisan can readily select and employ suitable components for a desired reaction or process, without undue experimentation.

According to some embodiments, processing or reaction components can be disposed in one or more retainment regions, channels, or fluid processing passageways, using any methods known in the art. For example, components can be sprayed and dried, delivered using a diluent, injected using a capillary, a pipette, and/or a robotic pipette, or otherwise disposed in the regions or channels.

According to various embodiments, a fluid processing device is provided that can comprise one or more fluid processing passageways that can comprise one or more elements, for example, one or more of a channel, a branch channel, a valve, a flow splitter, a vent, a port, an access area, a via, a bead, a reagent containing bead, a cover layer, a reaction component, any combination thereof, and the like. Any element can be in fluid communication with another element.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve disposed in the channel.

The term "in fluid communication" refers to in direct fluid communication and/or capable of direct fluid communication, unless otherwise expressly stated. The term "in valved fluid communication" refers to elements wherein a valve is disposed between the elements, such that upon opening or actuating the valve, fluid communication between the elements is established.

According to some embodiments a fluid processing device is provided. The device can comprise a substrate that can comprise, for example, a top or a first surface, and one or more fluid processing passageways that can be provided in communication with and/or can be defined by, for example, at least a portion of the top or first surface of the substrate. The one or more fluid processing passageways can be provided, for example, in a top or first surface of a substrate, on a top or first surface of a substrate, in a substrate, in a bottom or second surface of a substrate, on a bottom or second surface of a substrate, in an edge of a substrate, on an edge of a substrate, or any combination thereof. A fluid processing device can comprise different levels and layers of fluid processing passageways that can comprise, for example, different levels and layers of channels and regions. For example, a tiered, multichannel device can comprise one or more fluid processing passageways that traverse different heights or levels in the substrate.

Throughout the application, descriptions of various embodiments use "comprising" language; however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value ±5%. Therefore, for example, about 100 nl, could mean 95-105 nl. At the very least, each numerical parameter should at least be construed in light of the number of reported significant digits and by applying ordinary rounding techniques.

According to various embodiments, a fluid processing device is provided that comprises a substrate, a plurality of fluid retainment regions, and a composite material barrier. The plurality of fluid retainment regions can be formed in or on the substrate and can include at least a first fluid retainment region and a second fluid retainment region. The composite material barrier can at least partially separate the first fluid retainment region from the second fluid retainment region. The composite material barrier can comprise a mixture of at least a first component and a second component, wherein the first component can comprise a sequestering material and the second component can comprise one or more reaction components for a desired reaction.

According to various embodiments, a diagnostic device, that can be either portable or nonportable, is provided to perform one or more predetermined assays as desired, for example, in nucleic acid sequence detection technology. For a given assay, the assay protocol can involve a set of fluid handling steps such as mixing, incubation, washing, and the like, which are desirably performed in a given sequence of steps and for specified time periods for samples and reagents in specified volumes or proportions. The device can be miniaturized to the point that it can be used as a handheld portable diagnostic device. As shown in the exemplary embodiments illustrated in FIG. 2 and FIG. 3, the diagnostic device can include a plurality of fluid retainment regions, as exemplified below, interconnected by fluid processing passageways. The plurality of retainment regions can be included within a closed, disposable cuvette such that all of the retainment regions are closed to fluid flow to or from locations outside of the cuvette. The plurality of retainment regions in the cuvette can include a reaction retainment region, one or more reagent retainment regions, each containing unreacted reagents, a sample retainment region that can contain or receive a sample to be reacted with the unreacted reagents, and a composite material barrier. The unreacted reagents, which can include enzymes, buffers, catalysts, or other reaction components, can be contained in a first set of retainment regions that are interconnected with an intermediate set of retainment regions by fluid processing passageways containing pressure-actuated valves. Such reagents can be sequestered in the sequestering material of the composite material barrier. The intermediate retainment regions can also be connected through fluid processing passageways to a reaction retainment region, with the fluid processing passageways that connect the intermediate retainment regions to the reaction retainment region comprising a material that is adapted to reduce in volume within the fluid processing passageway when brought into contact with fluids from the intermediate retainment regions, or when brought into contact with a sample after the sample has been added to the sample retainment region.

A user can operate the diagnostic device by injecting a sample into the sample retainment region, prior to, at the same time as, or subsequent to pushing a button or otherwise applying pressure to the retainment regions that contain unreacted reagents. For example, a user can inject a sample and then push a button or other feature or area of the device. As an example of an assay performed with a device according to various embodiments, a typical ligation assay for detection of oligo-nucleotides can include constituents comprising the sample, a ligation oligomer, ligation reagent which can be a mixture of enzyme and buffer, a wash buffer, and extension and detection reagents. The sample, the ligation oligomer, and the ligation reagent can be allowed to mix and react along with wash buffers and the extension and detection reagents in an automatically controlled process. The process can occur after a user has injected the sample into the sample retainment region and has released the reagents from the unreacted reagent retainment regions by applying pressure to those retainment regions.

According to various embodiments, a diagnostic device can be provided that uses capillary driven flow for fluid actuation. The flow cross-section of the fluid processing passageways interconnecting the various retainment regions can contribute to the rate at which the reagents and sample are mixed in the reaction retainment region. Composite material valves placed within the flow control channels interconnecting the retainment regions can provide automatic flow control and timing of the fluid actuation.

According to various embodiments, a fluid flow modulator, as exemplified below with reference to a composite material valve in a flow control fluid processing passageway interconnecting fluid retainment regions, can comprise a material that dissolves and releases a reaction component when brought into contact with a fluid having desired characteristics. Herein, the phrase "dissolvable valve" will be used interchangeably with the phrase "solute bridge valve." The solute bridge valve can automatically control flow through the fluid processing passageway interconnecting the fluid retainment regions and control the timing of fluid actuation by exploiting the time it takes to dissolve, melt, or otherwise wash-away or reduce the volume of the material making up the solute bridge valve.

According to various embodiments, the fluid processing device comprises a fluid processing passageway, a plurality of fluid retainment regions with at least two of the fluid retainment regions each being in fluid communication with the fluid processing passageway, and a fluid flow modulator arranged in the fluid processing passageway and adapted to open and form, or to increase in size, a fluid communication between the at least two fluid retainment regions. The fluid flow modulator can comprise at least one sequestering material and a reaction component that can be adapted to dissolve when contacted with a first liquid. The first liquid can be, for example, and aqueous solution, suspension, mixture, or other aqueous material. The sequestering material and/or reaction component can be adapted to dissolve in water at room temperature. At least one of the plurality of fluid retainment regions can comprise an aqueous fluid retained therein.

According to various embodiments, the fluid processing device comprises a fluid flow modulator in the form of a valve. The valve can block fluid flow through a fluid processing passageway. The valve can be adapted to only partially block fluid flow through the fluid processing passageway. The valve can comprise the sequestering material and the sequestering material can partially, or fully, encapsulate, surround, isolate, hold, or otherwise sequester the reaction component. The reaction component can be uniformly or non-uniformly dispersed throughout the sequestering material or it can be concentrated in one or more regions of the sequestering material.

According to various embodiments, one or more reaction components can be sequestered, composited, stored, or otherwise retained in the sequestering material. The sequestering material can comprise, for example, but is not limited to, a dissolvable polymer, a porous polymer, a scaffold, a biodegradable scaffold, a porous ceramic, a combination thereof, and the like. The retainment material can be adapted to retain the reaction component and withhold the reaction component from a physical process or chemical reaction, for example, from an enzymatic reaction.

According to various embodiments, the sequestering material can comprise a polysaccharide, a water-soluble cellulose material, a chitosan material, a polyethyleneglycol material, a polyethyleneglycol derivative material, a water-soluble acrylamide material, a water-soluble acrylate material, a polyvinylalcohol material, or a combination thereof. According to various embodiments, the sequestering material can comprises at least one of a polyethylene glycol material, a derivative of a polyethylene glycol material, and a combination thereof, and can be adapted to dissolve when contacted with water at room temperature. The sequestering material can comprise at least one of a polyethylene glycol material and a derivative of a polyethylene glycol material, having a molecular weight of from about 500 Daltons to about 500,000 Daltons.

The sequestering material can comprise a dissolvable organic compound, for example, a polysaccharide, a water-soluble polysaccharide, or a water-soluble cellulose derivative. The sequestering material can comprise at least one of methylcellulose, hydroxymethyl cellulose, ethylcellulose, hydroxypropyl methylcellulose, quartemized hydroxyethylcellulose ethoxylate, (2-hydroxyethyl)-beta-cyclodextrin, carboxymethylcellulose, a sodium salt of carboxymethylcellulose, a potassium salt of carboxymethylcellulose, m-aminobenzyloxymethyl cellulose, cyanoethylated cellulose, diethylaminoethyl cellulose, and diethyl-(2-hydroxypropyl) aminoethyl cellulose.

The sequestering material can comprise at least one of polyvinyl alcohol, polyacrylamide, poly(N,N-dimethylacrylamide), an acrylate, a methacrylate, poly-2-hydroxyethylacrylate, a sulfonated polymer, polystyrene sulfonic acid, or a combination thereof.

Other materials that can be used as a sequestering material include the barrier, flow modulator, and valve, materials described in U.S. Provisional Patent Application No. 60/619,677, to Banerjee et al., in U.S. Provisional Patent Application No. 60/619,731, to Banerjee et al., and in U.S. Provisional Patent Application No. 60/619,623, to Faulstich et al., all filed on Oct. 18, 2004, and all of which are incorporated herein in their entireties by reference.

According to various embodiments, the barrier can comprise a mixture of a porous material that is insoluble in a first liquid, and one or more reaction components that is dissolvable in the first liquid. The first component can comprise a water-insoluble porous material and the second component can comprise a material that dissolves when contacted with water at room temperature. The first component can comprise a porous ceramic material. The first component can comprise a porous scaffold material. The first component can comprise a biodegradable polymer scaffold material. The first component can comprise a chitosan-gelatin scaffold material. The first component can comprise a water-insoluble cellulose derivative.

Exemplary insoluble structures can comprise, for example, porous monoliths, porous ceramic structures, porous metal structures, porous glass structures, porous glass beads, zeolite structures, and the like. The insoluble structure could include a structure comprising a silicium compound, zirconium oxide, a titanium oxide, calcium oxide, an aluminum oxide, or a combination thereof. Exemplary scaffold structures can comprise biodegradable scaffold structures or other scaffold structures such as those described in, for example: Murphy, W. L. et al., *Salt Fusion: An approach to improve pore interconnectivity within tissue engineering scaffolds*, Tissue Engineering, Vol 8, No 1, 2002, pp 43-52; Lin, A. S. P. et al., *Manufacture and Characterization of Novel 3D Porous Scaffolds for Bone Tissue Engineering*, BED-Vol. 50, 2001 Bioengineering Conference, ASME 2001, pp 203-204; Lin, H-R et al., *Preparation of Macroporous Biodegradable Polymer Scaffolds for Cell attachment using mixed salts as porogen additive*, B3-08, http://www.arofe.army.mil/conferences/icmat2001/symp_B01_B03.htm; Shu, M. J. et al., *Structure and Properties of Bilayer Chitosan-gelatin Scaffolds*, Biomaterials, 24(6), 2003, pp 1067-74; and Murphy, W. L., et al., *Tissue Engineering Scaffolds*, WO 2003057844; which are herein incorporated in their entireties by reference.

According to various embodiments, the reaction component can be released together with a dissolvable sequestering material, from a mixture of the two. The mixture can form a structure, for example, a barrier, a fluid flow modulator, or a valve structure. The dissolvable mixture can be formed, dispersed, distributed, dissolved in, impregnated in, or otherwise disposed in, an insoluble structure and/or in a scaffold structure.

Upon dissolution or other release from the sequestering material, the reaction component can be made available for a physical process or chemical reaction and can be capable of enabling the process or reaction.

The reaction component can comprise any of various chemical compounds, materials, or elements, including, but not limited to, any of the components described in U.S. Patent Application Publication No. US2004/0132051 A1, to Andersen, entitled "Mg-Mediated Hot Start Biochemical Reactions," published Jul. 8, 2004, which is incorporated herein in its entirety by reference. By retaining a reaction component and withholding it from a reaction the reaction can be prevented as can the formation of undesired side reactions, such as undesired primer-dimer formation reactions as described in US2004/0132051 A1.

The reaction component can be loaded in or mixed with the sequestering material in an amount sufficient to function as the reaction component. Exemplary weight percentages based on the total weight of the composite material can vary greatly depending on many factors, including the bulk of the sequestering material and the requirements of the reaction downstream. An exemplary range of reaction component weights can be from about 100 ppm to about 90 percent by weight, based on the total weight of the composite material that makes-up the barrier or flow modulator.

The reaction component can comprise at least one of an enzyme, a magnesium-dependent enzyme, a Taq polymerase enzyme, an enzyme for a nucleic acid sequence amplification reaction, or a combination thereof.

According to various embodiments, the reaction component can be a reaction component for an enzymatic reaction. The reaction component can comprise, for example, $Mg^{2+}$-Ions in the form of an $Mg^{2+}$ salt, such as $MgCl_2$. The reaction component can comprise an enzyme used for a nucleic acid sequence amplification reaction, such as a Taq polymerase enzyme. When the Ions are dissolved they initialize the enzymatic PCR reaction under conditions where primer dimer formation and other side reactions do not occur. Other examples of reaction components for enzymatic reactions that can be sequestered are those useful for ligation reactions, endonuclease reactions, polymerase reactions, and reactions that utilize cofactors for enzymes. According to various embodiments, enzymatic reactions wherein enzymes and substrates need to be stored in the same device or even within the same chamber over a weeks or months, can benefit from various embodiments wherein a cofactor necessary for enzyme performance can be sequestered to prevent even slight enzymatic activity over time, and to prevent degradation of the substrate.

The reaction component can comprise salts and other compounds or materials that can dissolve to form ions of at least one of cobalt, sodium, manganese, magnesium, potassium, calcium, lithium, complex ions, and combinations thereof. The reaction component can comprise an ionic catalyst and counterions. Exemplary ions and counterions can comprise $H_3O^+$, $OH^-$, $SO_4^{2-}$, $NO_3^-$, and $Cl^-$. The concentration of ions, ion-releasing compounds, or material sequestered can be sufficient to form an electrolyte when dissolved in a first liquid, and the electrolyte can be used in an on-device battery comprising two different metal terminals or electrodes also included in the device. An exemplary battery geometry can comprise an electrical communication to be two terminals. An electrolyte forming agent, for example, an acidic agent, can be sequestered in the sequestering material and released upon dissolution by a liquid to form an electrolyte in electrical contact with both terminals. Electrical potential generated by the battery can be used for any of a variety of purposes, for example, to heat a reaction chamber, activate a pump, or activate an indicator. The liquid can be provided from one or more sides of the barrier.

The reaction component can comprise at least one nucleotide, a mixture of nucleotides, at least one oligonucleotide, at least one labeled oligonucleotide, at least one fluorescently-labeled oligonucleotide, at least one ribonucleotide triphosphate, at least one deoxyribonucleotide triphosphate, a buffering agent, a chelating agent, or a combination thereof. The reaction component can comprise a replication complex, for example, an SV40 rolling circle complex. The reaction component can comprise a replication protein. The reaction component can comprise a set of nucleotides for a replication process. The reaction component can comprise a mixture of different reaction components, for example, a mixture of different nucleotides or different oligomers, with each being provided in different respective concentrations, or in the same concentration, as one or more of the other reaction components.

According to various embodiments, the reaction component can comprise at least one heat-generating or heat-absorbing salt. The salt can generate or absorb heat when dissolved, for example, in water. The reaction component can comprise at least one salt selected from LiCl, $LiClO_4$, LiI, CsF, and combinations thereof. The heat generated by the dissolution of such salts can be used to initiate, promote, or facilitate a reaction in the device. These salts can each be sequestered in a dissolvable organic polymer or in a porous structure.

The reaction component can comprise at least one salt selected from $N(CH_3)_4Br$, $AgNO_3$, $NaClO_3$, $CsClO_4$, and combinations thereof. The heat absorbed by dissolution of these salts can be used in the device to control, stop, slow-down, or promote a reaction. These salts can each be sequestered in a dissolvable organic polymer or in a porous structure.

The reaction component can be adapted to serve as a porogen or filler. The reaction component can be encapsulated, embedded, dispersed, dissolved, uniformly distributed throughout, non-uniformly distributed throughout, or otherwise isolated, separated, or retained by the sequestering material. The reaction component can be applied or disposed in a fluid processing device as a neat reaction component, and then isolated by the sequestering material. The reaction component can be applied or disposed in a fluid processing device as a mixture with the sequestering material.

The reaction component can be released from the sequestering material in response to one or more stimulus. Exemplary stimuli can comprise contact with a first fluid or liquid, contact with an aqueous material and subsequently dissolution, contact with an acidic material, contact with an alkali material, contact with a material at a minimum temperature, or a combination thereof.

According to various embodiments, to initialize release of the reaction component the reaction component can be dislodged, freed, and/or dissolved from a soluble structure, from a non-soluble structure, from a soluble porous structure, from a non-soluble porous structure, or from a combination of such structures. The solubility of the structure would be determined by the liquid which is to contact the structure in operation. For processing aqueous samples at room temperature, a soluble structure would be one that can dissolve in water at room temperature.

The barrier can separate a first reagent for a reaction, retained in the first fluid retainment region, from a second reagent for the same reaction, retained in the second fluid retainment region. The first and second reagents can be the same as, or differ from, one another. As an example, a first reagent comprising a PCR mastermix including nucleotides can be separated, by the barrier, from a second reagent including a PCR enzyme. The barrier can include yet another reaction component, for example, a magnesium catalyst, sequestered in a sequestering material. After time, at least one of the first and second reagents can contact the barrier, release the magnesium catalyst, and form a fluid communication where the formerly-intact barrier had been, such that the first and second reagents can contact and react with one another.

According to various embodiments, the barrier can be ring-shaped, square-shaped, star-shaped, a polygon, or any other shape. The barrier can comprise, for example, an outer wall having the shape of a polygon. The barrier can comprise a fluid flow modulator arranged in a fluid processing passageway and adapted to open to form, or to increase in size, a fluid communication between at least two fluid retainment regions. The barrier can be a dissolvable composite material valve that, upon at least partial dissolution, can release a sequestered or composited reaction component into a fluid retainment region or fluid reaction pathway.

The barriers, flow modulators, and valves described herein can have the shapes, sizes, components, chemicals, and other properties described with reference to the barriers, flow modulators, and valves described in U.S. Provisional Patent Application No. 60/619,677, to Banerjee et al., in U.S. Provisional Patent Application No. 60/619,731, to Banerjee et al., and in U.S. Provisional Patent Application No. 60/619,623, to Faulstich et al., all filed on Oct. 18, 2004, and all of which are incorporated herein in their entireties by reference.

According to various embodiments, the fluid processing device comprises a fluid processing passageway dimensioned so that a flow of fluid from at least one of two or more fluid retainment regions and through the fluid processing passageway, can occur by capillary action. One or more maximum dimensions of about five millimeter or less, for example, about two millimeters or less, about one millimeter or less, from about greater than zero to about five millimeters, from about greater than zero to about two millimeters, or from about greater than zero to about two millimeters.

According to various embodiments, the fluid processing device comprises a fluid processing passageway dimensioned so that a migration of charged components in a fluid, from at least one of the fluid retainment regions through the fluid processing passageway, is capable of migration by electrokinetic action. One or more maximum dimension of about five millimeter or less, for example, about two millimeters or less, or about one millimeter or less.

According to various embodiments, the fluid processing device can comprise at least two electrodes disposed in the device with a fluid processing passageway therebetween. A system can be provided that includes electrical leads that can be electrically connected to the electrodes.

According to various embodiments, the fluid processing device can comprise at least one additional fluid retainment region, at least one additional fluid processing passageway, and at least one pressure-actuatable valve arranged in the at least one additional fluid processing passageway. The additional fluid processing passageway can be in fluid communication with the additional fluid retainment region and one or more other fluid retainment regions. The pressure-actuatable valve can comprise a frangible diaphragm. The frangible diaphragm can comprise a material that is insoluble in water at room temperature. The pressure-actuatable valve can comprise a burstable valve that is adapted to open and establish fluid communication upon a change in pressure, for example, adapted to open only upon receiving pressure of at least about 0.1 psig, for example, at least about 0.5 psig, at least about one psig, or at least about three psig from a fluid in at least one additional fluid retainment region. The device cam comprise a liquid retained in at least one additional fluid retainment region.

According to various embodiments, the fluid processing device can comprise at least one heat-actuatable valve arranged in at least one additional fluid processing passageway. The at least one additional fluid processing passageway can be in fluid communication with at least one additional fluid retainment region and at least one of the plurality of fluid retainment regions. The heat-actuatable valve can comprise at least one material selected from a rubber, a plastic, a wax, a paraffin, a polyethylene glycol material, a derivative of a polyethylene glycol material, a polysaccharide, a derivative of polysaccharide, and combinations thereof. The heat-actuatable valve can comprise a material that is insoluble in water at room temperature. The heat-actuatable valve can comprise a material that has a melting point of from about 35° C. to about 95° C., for example, from about 35° C. to about 70° C., from about 35° C. to about 65° C., or from about 35° C. to about 50° C.

According to various embodiments, the fluid processing device can comprise a liquid retained in at least one fluid retainment region. The fluid processing device can comprise a first reagent for a reaction, retained in at least a first one of the plurality of fluid retainment regions. The fluid processing device can comprise a second reagent for the reaction retained in at least a second one of the plurality of fluid retainment regions. The second reagent can be the same as, or can differ from, the first reagent.

According to various embodiments, methods are provided for processing a fluid. The method can comprise contacting a barrier that includes a dissolvable reaction component, with a first liquid in which the reaction component is dissolvable. The barrier can also include a sequestering material that can be soluble in the first liquid, or insoluble in the first liquid.

The method can comprise contacting a barrier that includes a dissolvable sequestering material, with a first liquid in which the sequestering material is dissolvable. The method can comprise dissolving the sequestering material such that a sequestered or composited reaction component is released into the first liquid. The method can further comprise dissolving at least a first component of a barrier to form a fluid communication between a first and a second retainment region.

According to various embodiments, the method can comprise releasing a reaction component from a barrier that comprises a mixture of at least a porous material that is insoluble in a first liquid, and a reaction component selected from at least one of a reactant, a reagent, a catalyst, an initiator, a promoter, a cofactor, an enzyme, or a combination thereof. The method can include contacting the barrier with the first liquid such that the reaction component is released into the first liquid. The reaction component can be dissolvable or insoluble in the first liquid. The barrier can comprise a flow modulator or valve disposed along a fluid communication between two or more fluid retainment regions. The method can include flowing a fluid through the barrier and mixing two reagents together that had been separated by the barrier.

According to various embodiments, a method is provided whereby a barrier comprising a dissolvable material, for example, salt, is contacted with a liquid such that the dissolvable material is dissolved and released into the liquid. The dissolvable material can be an exothermic or endothermic salt and can change the temperature of the liquid upon contact therewith. The temperature of a reaction can be controlled by controlling the release of such salts from the sequestering material. Molecular weight, pore size, and other factors can be taken into consideration in determining a proper rate of dissolution of the sequestering material or release of the reaction component from the barrier material.

According to various embodiments, a method is provided whereby a barrier comprising a dissolvable salt is contacted with a liquid such that the salt is dissolved and released into the liquid. The salt can be an exothermic or endothermic salt and can change the temperature of the liquid upon contact therewith. The temperature of a reaction can be controlled by controlling the release of such salts from the sequestering material. Molecular weight, pore size, and other factors can be taken into consideration in determining a proper rate of dissolution of the sequestering material or release of the reaction component from the barrier material.

According to various embodiments, a method is provided that comprises processing a fluid processing device that comprises at least a first fluid retainment region and a second fluid retainment region, and a barrier arranged between them. At least one of the first and second fluid retainment regions retains an aqueous solution. The barrier can comprise a sequestering material and a reaction component. The barrier can be adapted to dissolve when contacted with a first liquid, for example, an aqueous solution or an organic solvent. According to various embodiments, the method includes contacting the barrier with the first liquid aqueous solution to dissolve at least a portion of the barrier and form, or increase the size of, a fluid communication between the first fluid retainment region and the second fluid retainment region. The fluid processing device can comprise at least one additional fluid retainment region, at least one fluid processing passageway, and at least one pressure-actuatable valve arranged in the at least one fluid processing passageway. The at least one fluid processing passageway can be in fluid communication with the at least one additional fluid retainment region and at least one of the first fluid retainment region and the second fluid retainment region. The method can comprise opening the pressure-actuatable valve. The pressure-actuatable valve can comprise a diaphragm and the method can comprise bursting the diaphragm by applying pressure to the diaphragm. A heat-actuatable valve can be actuated instead of, or in addition to, actuation of a pressure-actuatable valve.

According to various embodiments, the method can comprise migrating charged components in a sample from at least one of the at least two fluid retainment regions, through the fluid processing passageway, by electrokinetic motion. Migration of the charged components can be accomplished by creating an electric field in the device. A system can be provided that includes an electric field generator.

According to various embodiments, a method can comprise creating a pressure differential between a first fluid retainment region and a second fluid retainment region, and moving, with the pressure differential, a fluid from one of the first fluid retainment region and the second fluid retainment region into the other of the first fluid retainment region and the second fluid retainment region. The pressure differential can be generated by activating a pump. The pressure differential can comprise a positive-pressure differential or negative-pressure differential. A positive pressure means a pressure at or greater than atmospheric pressure, i.e., 1 atm. A negative pressure means a pressure less than atmospheric pressure, i.e. less than 1 atm.

According to various embodiments, the method can comprise creating a magnetic field across a first fluid retainment region and a second fluid retainment region, and moving, with the magnetic field, magnetically attractable materials from one of the retainment regions toward the other retainment region.

According to various embodiments, the method can comprise performing a set of predetermined assays in a plurality of fluid retainment regions, for example, retainment regions, in a closed, disposable device. An exemplary device is a cuvette. The fluid retainment regions can be interconnected by channels but closed to fluid flow to or from locations outside of the cuvette. The first fluid retainment regions can be selectively closed-off from fluid communication with second fluid retainment regions through first channels that interconnect them. Selective closing-off can be provided by pressure-actuated valves positioned in the first channels. The second fluid retainment regions can be interconnected to third fluid retainment regions by second channels. Flow through the second channels can be controlled by fluid flow modulators positioned in the second channels, which can also provide selective closing-off. The method can comprise applying pressure to a pressure-actuated valve in a first channel sufficient to break the valve and provide fluid communication between the first and second fluid retainment regions. Such a method can be used to introduce a sample for testing or other processing into one or more third fluid retainment regions and/or establishing fluid communication between the second fluid retainment regions and one or more third fluid retainment regions, at a controlled rate. The controlled rate can be a function of characteristics of at least one of a fluid in a third retainment region and a fluid within the second retainment regions.

According to various embodiments, a system is provided that comprises a fluid processing device as described herein, and a pump, wherein the pump is arranged in fluid communication with at least one of a fluid processing passageway and one or more fluid retainment regions.

A system can be provided that comprises a fluid processing device as described herein, a power source, and at least two electrical leads forming electrical connections, respectively, between the power source and the at least two electrodes. A system can be provided that comprises a fluid processing device as described herein, and a magnet, wherein the magnet generates a magnetic field and the fluid processing device is arranged at least partially within the magnetic field.

Exemplary devices and methods according to various embodiments are described below with reference to the drawings. The present teachings are not limited to the embodiments depicted in the drawings.

Figure 1A:
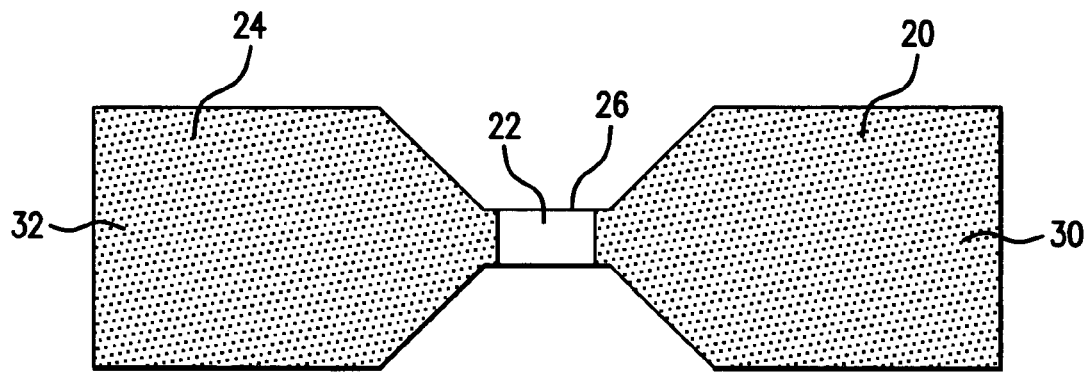
Figure 1B:
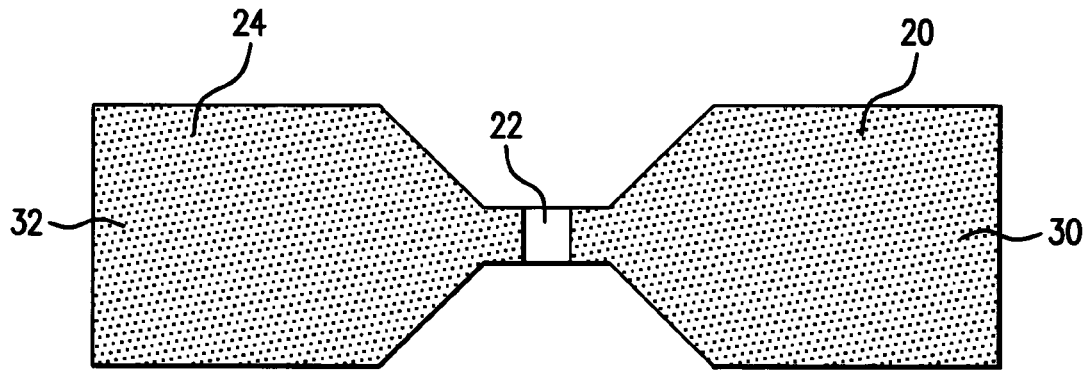
Figure 1C:
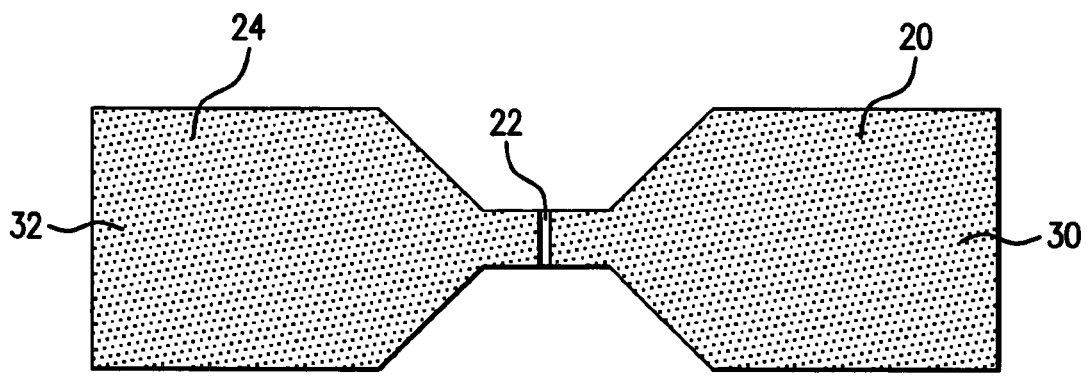

Referring to FIGS. 1(a)-1(c), a schematic illustration of the process by which a solute bridge valve establishes fluid communication between two fluid processing passageways, according to various embodiments, is shown. FIG. 1(a) shows two retainment regions 20, 24 containing fluids 30, 32, respectively, with the two retainment regions 20, 24 being interconnected through a fluid processing passageway 26. A composite material valve comprising a dissolvable sequestering material and a reaction component, herein exemplified as a solute bridge valve 22, can be provided as a plug of material that completely or partially blocks the fluid processing passageway 26 and separates the fluids, e.g. solvents, reagents or other materials, in the respective retainment regions 20, 24. In some embodiments, one or both of fluids 30 or 32, can, at least initially, comprise a gas, a vacuum, a partial vacuum, and/or a pressurized fluid.

FIG. 1(b) shows the size of the solute bridge valve 22 decreasing as the material that makes up the solute bridge valve gradually dissolves into one or both of the fluids 30, 32 in retainment regions 20, 24 and releases the reaction component into one or both of the retainment regions. FIG. 1(c) shows that the fluids 30, 32 have come into contact with each other when the sequestering material and reaction component making up solute bridge valve 22 has completely dissolved. The time required to completely dissolve the solute bridge valve 22 can be determined by the cross-sectional area and/or shape of the capillary fluid processing passageway 26 and the length and dissolvability of the solute bridge valve 22. By controlling the material and/or size of the solute bridge valve 22, it is also possible to control the length of the time elapsed before the solute bridge valve has completely dissolved to allow mixing of the fluids 30, 32.

It is desirable for the material that makes up the solute bridge valve 22 to be a material that dissolves into the fluids 30, 32. The material of the solute bridge valve also is desirably compatible with the assay to be conducted, and would not adversely affect the assay condition. The solute bridge valve material could also be an active ingredient that might catalyze or react with constituents of the assay. Examples of material that can be used to make up the solute bridge valve 22 include polyethyleneglycol (PEG) and derivatives of polyethyleneglycol, together referred to herein as PEG. PEG has desirable properties and some PEG materials can dissolve in aqueous liquids, such as those typically used in many biological assays. PEG is generally inert and generally does not affect biological assays. PEG is easy to pattern using microfabrication techniques. PEG can be formulated that melts at relatively low temperatures, i.e. 35-50° C., and can be used as a thermal "wax." PEG solutions are known to prevent non-specific binding and precipitation of proteins and peptides on walls of the fluid processing passageways. PEG is hygroscopic and stabilizes proteins in solutions.

According to various embodiments, the solute bridge valve 22 can be made from a material that partially or completely separates the retainment regions 20, 24 in the diagnostic device. Flow control through the fluid processing passageway 26 can be affected by the change in the open cross-sectional area of the fluid processing passageway between the two retainment regions, subsequent to the change in volume of the material. The actuation of the solute bridge valve 22 can comprise the volumetric change of the material resulting from contact with the solution or solutions in the retainment regions 20, 24. A change in volume of the material can result from other characteristics of the solution or solutions, such as temperature, water content, chemical composition, electrical charge, magnetic properties, or the like. If the material making up the solute bridge valve 22 completely blocks the channel 26, the two retainment regions 20, 24 are completely separated and the valve is closed.

FIG. 2 shows an embodiment of an assay device that uses capillary driven flow and solute bridge valves to control a specific sequence of fluid actuation steps. The device shown in FIG. 2 can be constructed as a microfluidic chip manufactured using microfabrication techniques. According to various embodiments, the chip can comprise a set of retainment regions and microchannels for housing different liquids such as reagents, samples, etc., and for mixing and reacting the various liquids. FIG. 2 shows a device according to various embodiments having a sample retainment region 90 connected through a fluid processing passageway 80 to a reaction retainment region 48. An intermediate retainment region or retainment regions is/are connected through a fluid processing passageway 170 containing a valve 70 to the reaction retainment region 48. A second intermediate retainment region 46 is connected through a fluid processing passageway 172 containing a valve 72 to the reaction retainment region 48. A first reagent retainment region 40 for containing unreacted reagents 120 can be connected through a fluid processing passageway 160 containing a valve 60 to one intermediate retainment region 44, while a second reagent retainment region 42 containing unreacted reagents 124 can be connected through a fluid processing passageway 162 containing a valve 62 to the second intermediate retainment region 46. The reaction retainment region 48 is connected through a fluid processing passageway 174 containing a valve 74 to a first waste retainment region 50. The waste retainment region 50 can also be connected, through another fluid processing passageway 176 containing a valve 76, to a second waste retainment region 52.

Reagent retainment regions 40, 42 can be selectively separated from the intermediate retainment regions 44, 46 by the pressure-actuated valves 60, 62 placed within the fluid flow passages 160, 162. According to various embodiments, the pressure-actuated valves 60, 62 within fluid processing passageways 160, 162 can be diaphragms that are burstable upon pressure being applied to the reagent retainment regions 40, 42.

The intermediate retainment regions 44, 46 can be in turn connected through the fluid flow passages 170, 172 containing valves 70, 72 to the reaction retainment region 48. Fluid communication through the fluid flow passages 170, 172 containing valves 70, 72 can be controlled by the fluid flow cross-sectional area of the passages 170, 172 as well as the positioning of solute bridge valves 70, 72 as discussed above, within the fluid flow passages 170, 172. The solute bridge valves 70, 72 contained within the fluid flow passages 170, 172 can provide automatic control of the fluid communication between the intermediate retainment regions 44, 46 and the reaction retainment region 48 as a result of their responsiveness to stimuli such as the chemical composition of the fluids within retainment regions 44, 46 and within reaction retainment region 48. Each of regions 90, 48, 40, 42, 50, and 52, can optionally comprise a vent 91, 49, 41, 43, 51, and 53, respectively.

FIG. 3 illustrates an embodiment wherein the retainment regions and channels are arranged such that solute bridge valves 70a, 72a, 74a, 76a corresponding to solute bridge valves 70, 72, 74, 76 of the embodiment shown in FIG. 2, are arranged in a line for ease of manufacture. Each of regions 90a, 48a, 40a, 42a, 50a, and 52a, can optionally comprise a vent 91a, 49a, 41a, 43a, 51a, and 53a, respectively.

FIGS. 4A-4J illustrate a sequence of events that can occur during operation of a diagnostic device according to various embodiments, such as exemplified in FIG. 2. FIGS. 4A-4J are explained in greater detail below. Each of regions 90, 48, 40, 42, 50, and 52, can optionally comprise a vent 91, 49, 41, 43, 51, and 53, respectively.

FIGS. 5A-5J illustrate a sequence of events that can occur during operation of a diagnostic device according to various embodiments, such as exemplified in FIG. 3. FIGS. 5A-5J are explained in greater detail below. Each of regions 90a, 48a, 40a, 42a, 50a, and 52a, can optionally comprise a vent 91a, 49a, 41a, 43a, 51a, and 53a, respectively.

Figure 4A:
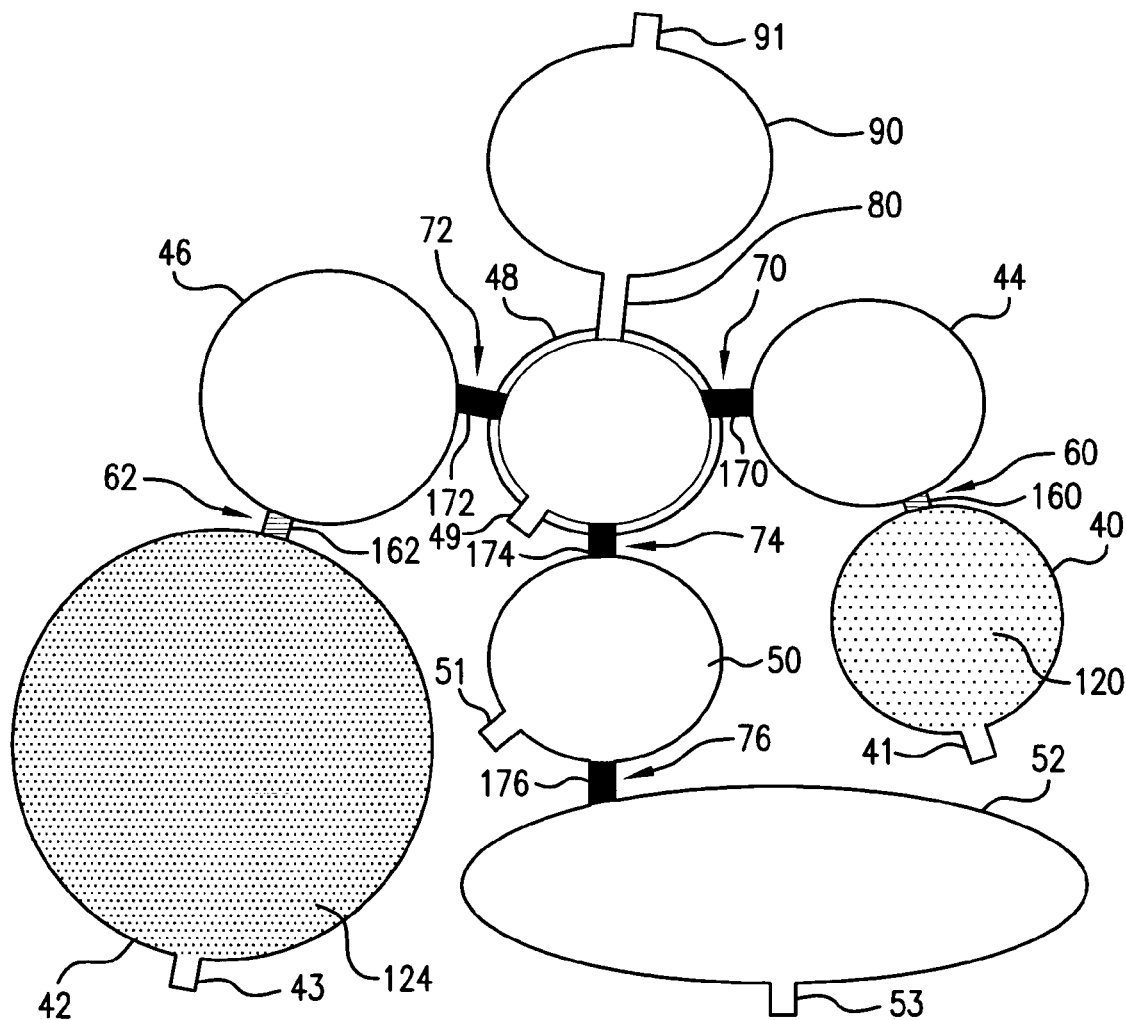

In FIG. 4A a diagnostic device according to various embodiments is provided with retainment regions 40, 42 prefilled with, for example, a wash buffer 124 in retainment region 42 and a detection reagent 120 within retainment region 40. Pressure-actuated valves 60, 62, such as burstable or tearable diaphragms, can be provided within the fluid flow passages 160, 162 separating retainment regions 40, 42 from intermediate retainment regions 44, 46.

Figure 4B:
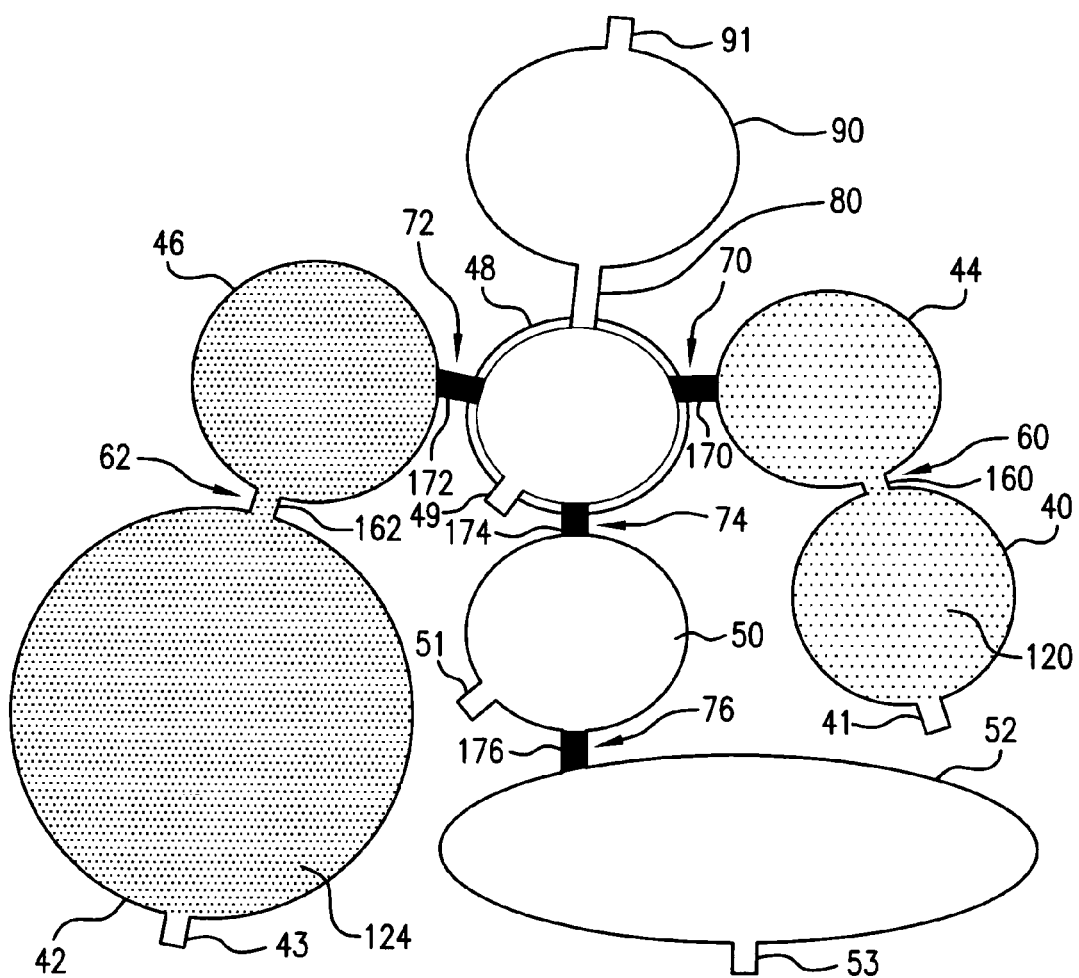

In FIG. 4B a user can apply pressure to the retainment regions 40, 42, thereby actuating or bursting the valves 60, 62 within fluid flow passages 160, 162. Bursting valves 60, 62 can cause a flow of the buffers and/or reagents within the retainment regions 40, 42 into intermediate retainment regions 44, 46.

Figure 4C:
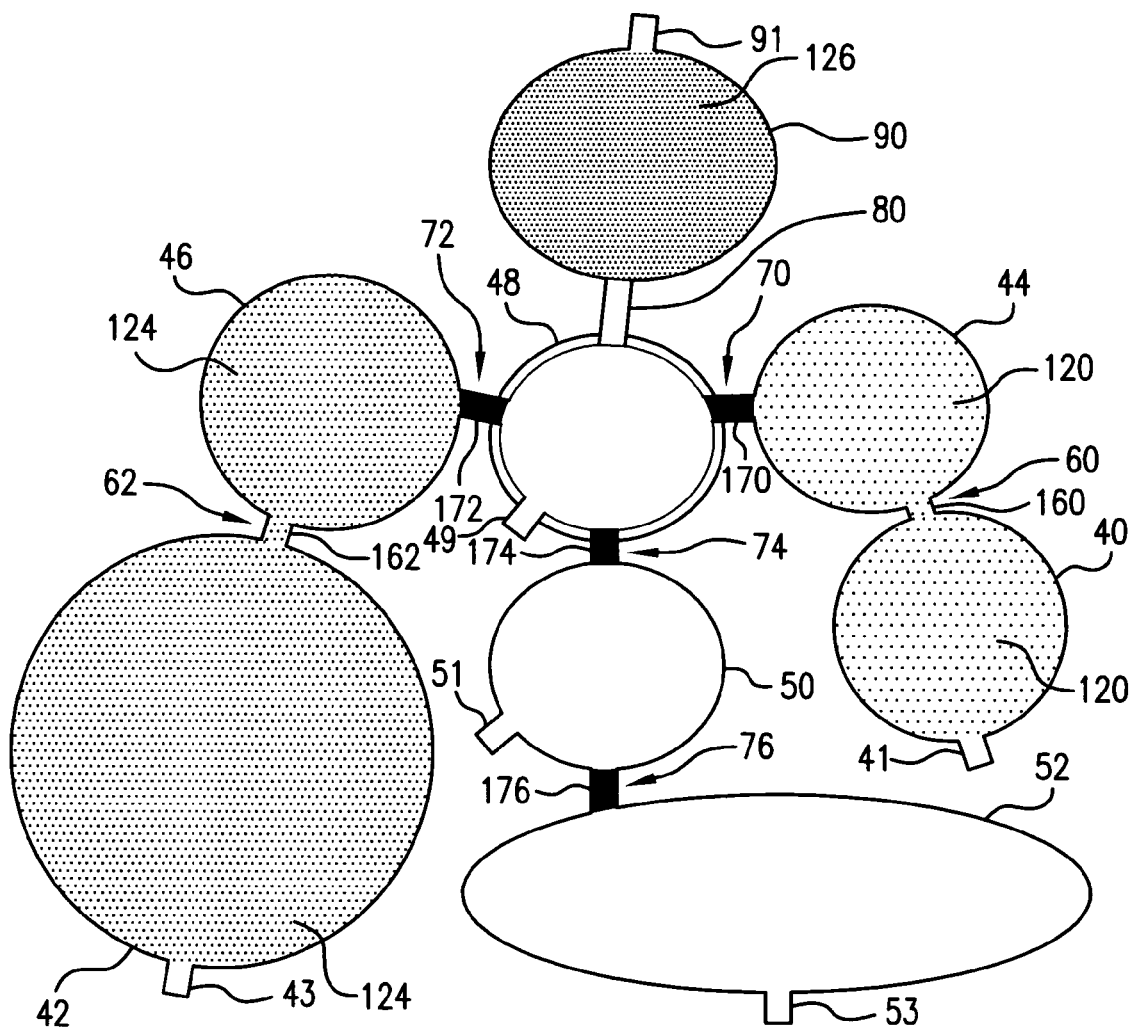

As shown in FIG. 4C a user can then inject a sample 126 into the sample retainment region 90, which is connected to the reaction retainment region 48 through a fluid processing passageway 80. Sample injection could alternatively occur before or at the same time as bursting the valves. Sample injection can be performed, for example, by piercing a cover layer or through a septum (not shown). Fluid processing passageways 170, 172 and 80 can be provided with fluid flow modulators, exemplified below with reference to a solute bridge valve, such as a plug of material that can change volume when exposed to certain stimuli. The solute bridge valves can control the fluid communication between intermediate retainment regions 44, 46 and reaction retainment region 48, as well as the fluid communication between the sample retainment region 90 and the reaction retainment region 48. Fluid flow of the sample from sample retainment region 90 into reaction retainment region 48 can also be automatically controlled as a result of the dimensions of the fluid processing passageway 80. For example, the fluid processing passageway 80 can be provided as a capillary passageway such that the sample material from sample retainment region 90 gradually wicks into the reaction retainment region 48, without the need for a solute bridge valve to control this flow through fluid processing passageway 80. Pressure can be relieved or equalized via vent 91 and/or 49.

Figure 4D:
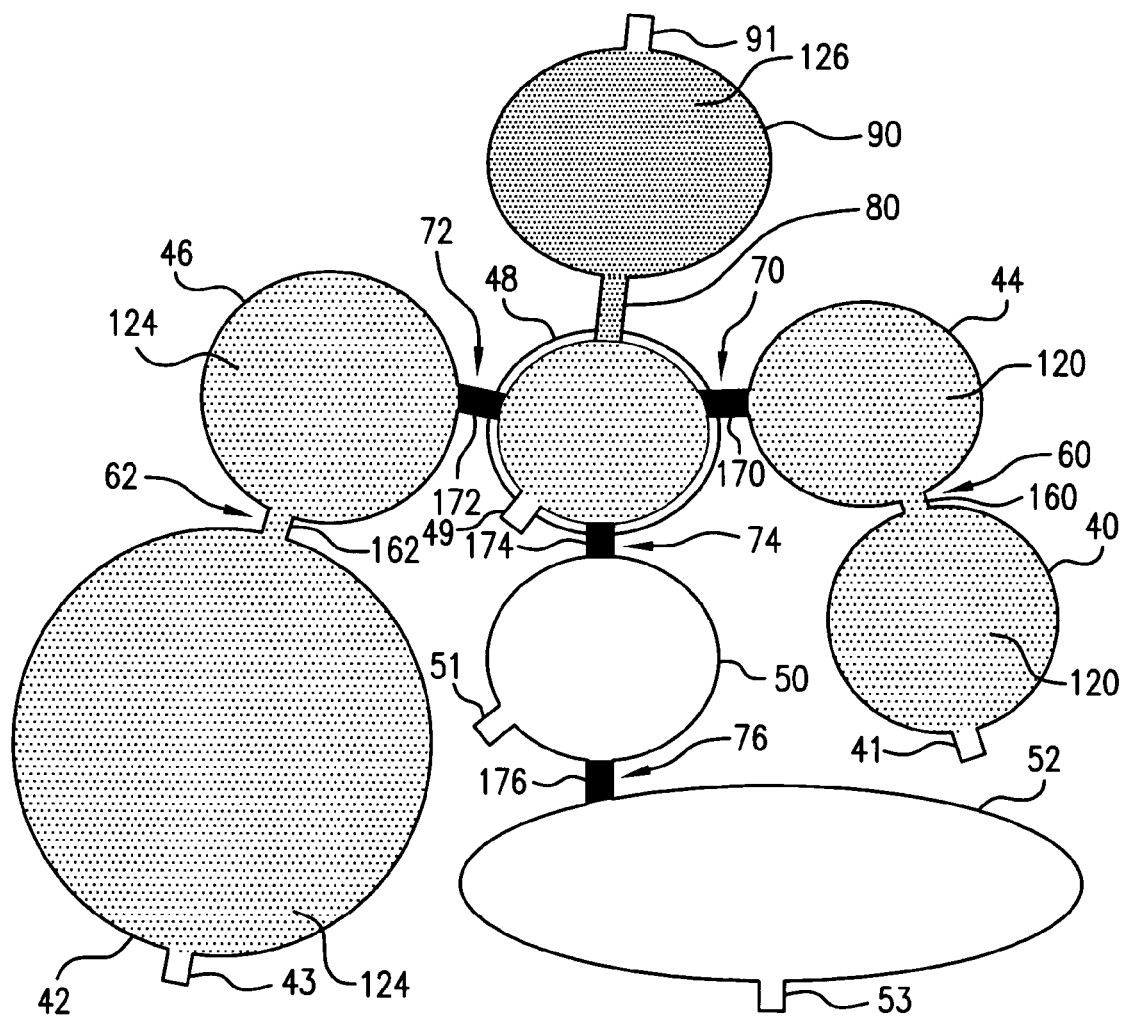
Figure 4E:
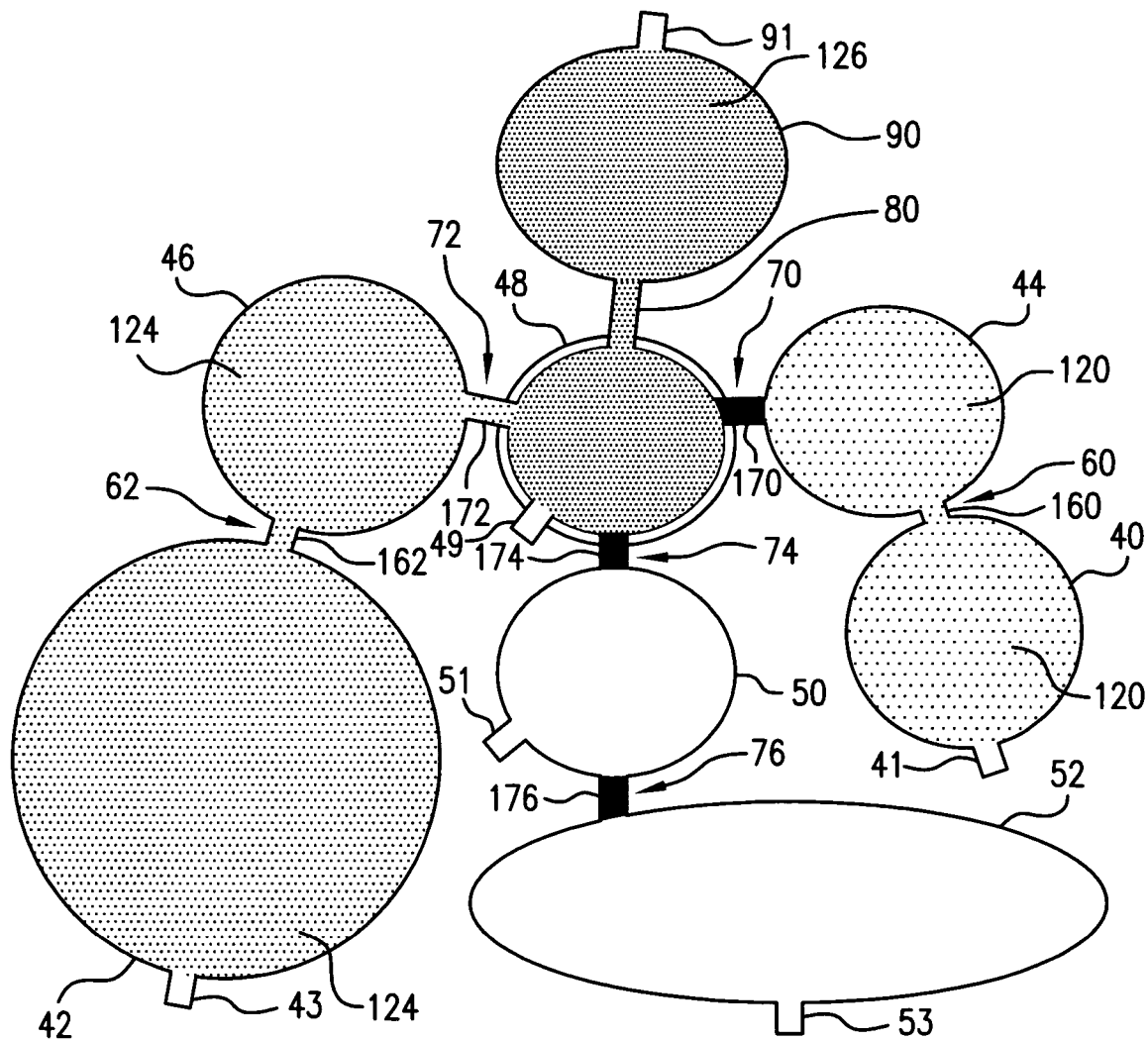

As shown in FIG. 4D, the sample material that is now in reaction retainment region 48 contacts the solute bridge valve 72 on one side of the valve 72 in fluid processing passageway 172, while the reagent in intermediate retainment region 46 contacts the solute bridge valve 72 from the opposite side of the valve. One or more of the reagents in retainment region 46 and/or the sample in reaction retainment region 48 begin to dissolve or otherwise affect the volume of the material making up the solute bridge valve 72. After a certain amount of time that is automatically controlled by at least one of the flow cross-section of fluid processing passageway 172, or the volume or composition of material at least partially making-up the solute bridge valve 72, the solute bridge valve 72 no longer prevents the reagent in retainment region 46 from gradually diffusing into the sample 126 in reaction retainment region 48, as shown in FIG. 4E. As the solute bridge valve 72 dissolves, it releases the reaction component into the processing stream so the reaction component can take part in one or more reactions. The controlled dissolution of the solute bridge valve 72 can control the timing of the interaction between the reaction component and other components of a reaction. Pressure can be relieved and/or equalized via vent 43.

Figure 4F:
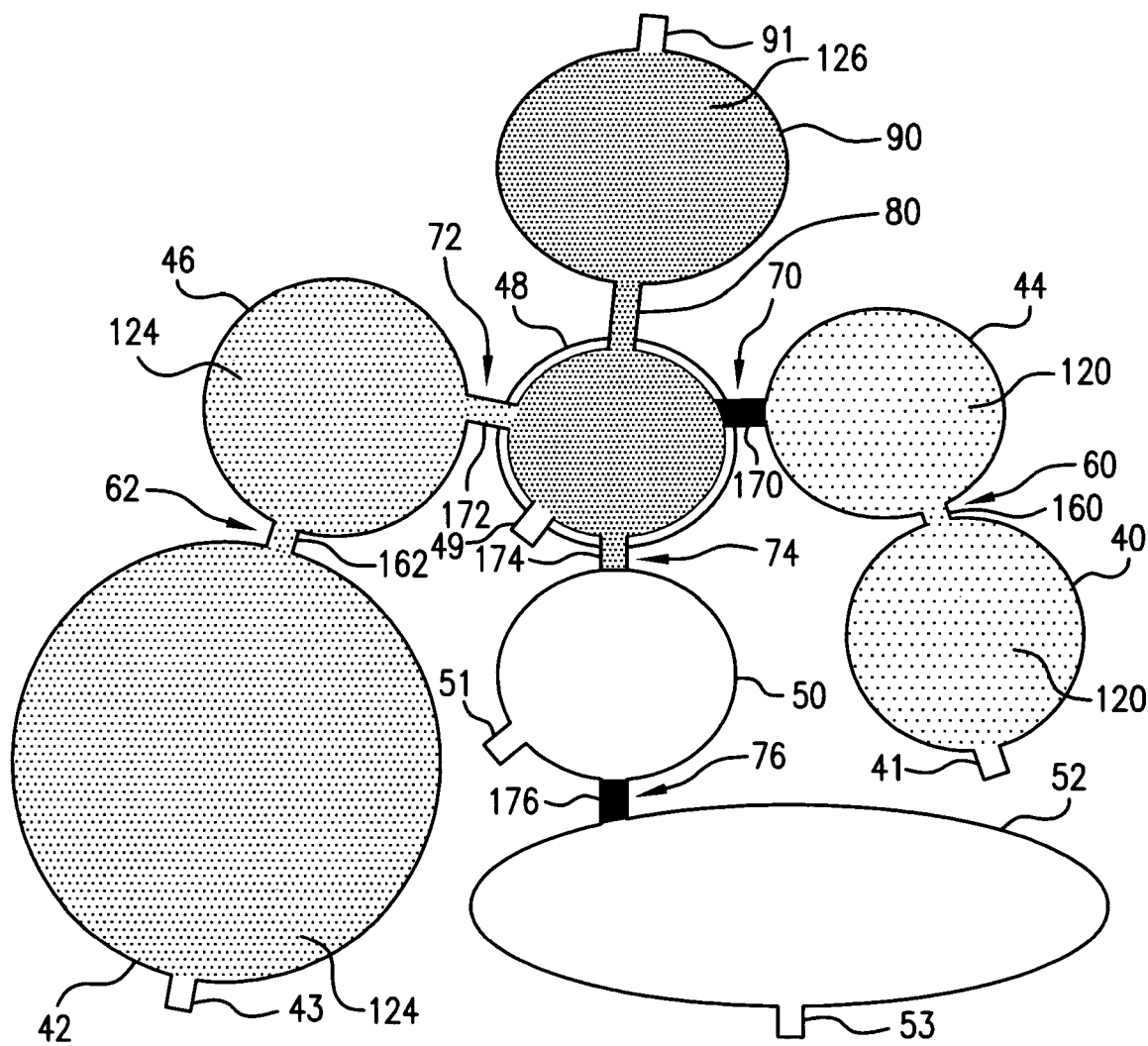
Figure 4G:
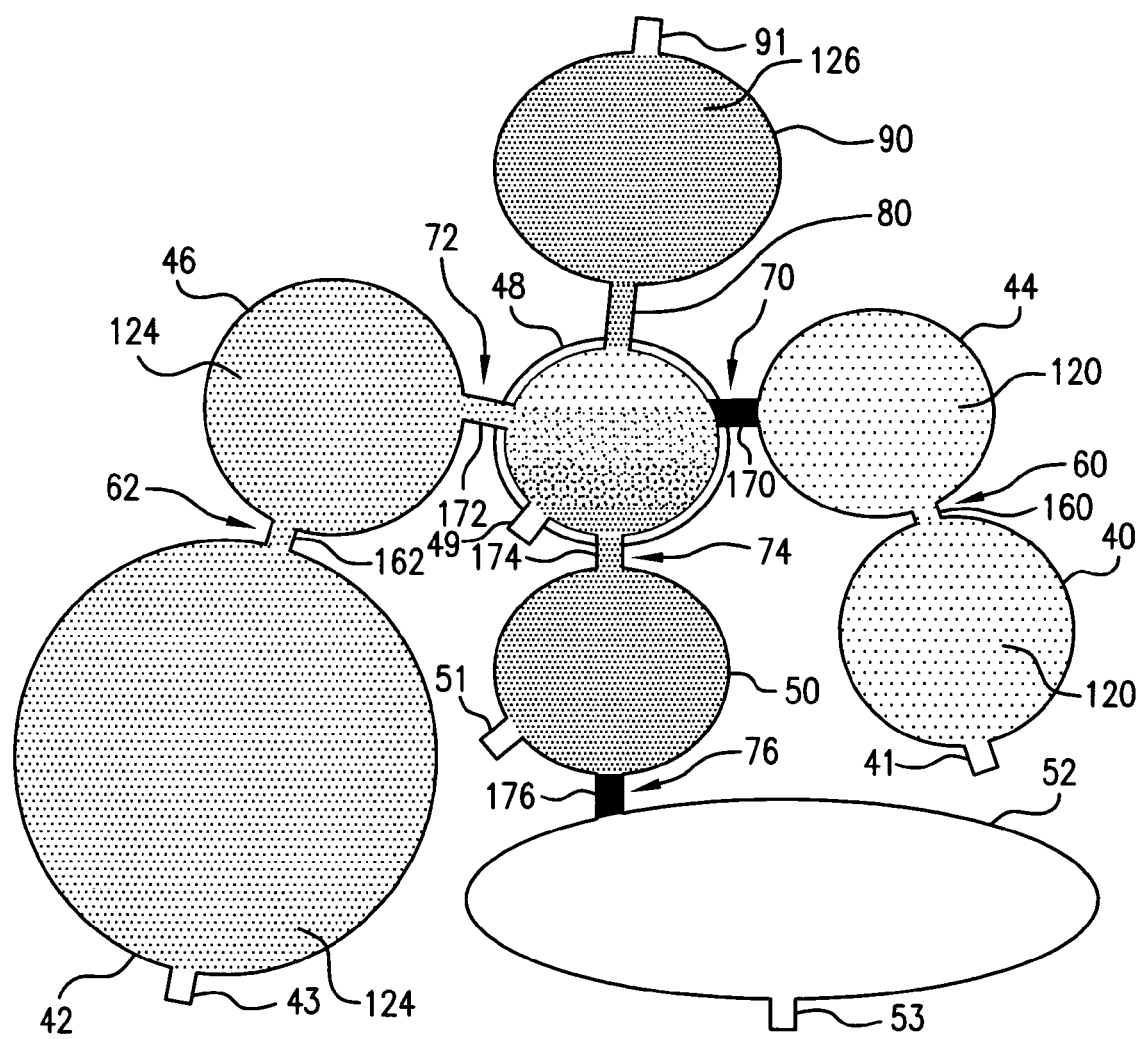

The fluid processing passageway 174 leading from the reaction retainment region 48 into waste retainment region 50 can also be provided with dimensions that allow for capillary action, and a solute bridge valve 74 that will gradually dissolve or otherwise change volume as a result of contact with the fluid from reaction retainment region 48. As shown in FIG. 4F, the effect of the fluid within reaction retainment region 48 on the solute bridge valve 74 within fluid processing passageway 174 gradually opens the fluid processing passageway 174 within which the valve 74 is positioned to allow fluid communication between the reaction retainment region 48 and the first waste retainment region 50. The flow of fluid from reaction region 48 into waste region 50 through fluid processing passageway 174 contributes to a capillary flow of more reagent from reagent region 42 through fluid processing passageway 162 and intermediate region 46 into reaction region 48. Pressure resulting from such flow can be relieved via vent 43 and/or vent 49. Flow of fluid from reaction region 48 into waste region 50, as shown in FIG. 4G, can also cause more of sample 126 to flow from sample region 90 into reaction region 48. Pressure resulting from the flow of fluid from reaction region 48 into waste region 50, can be relieved via vent 49 and/or vent 51. According to various embodiments, the relative dimensions of the flow passages such as fluid processing passageway 80 leading from sample retainment region 90 into reaction retainment region 48, and the fluid processing passageway 172 within which valve 72 is positioned leading from intermediate retainment region 46 into reaction retainment region 48, can be selected in order to contribute to a preferential flow of fluid from the intermediate retainment region 46 into reaction retainment region 48. A smaller flow cross-section through fluid processing passageway 80 than the flow cross-section through fluid processing passageway 172 would result in more fluid flowing from the reagent retainment region 42 and intermediate retainment region 46 into reaction retainment region 48 than the amount of sample flowing from sample retainment region 90 into the reaction retainment region 48.

Figure 4H:
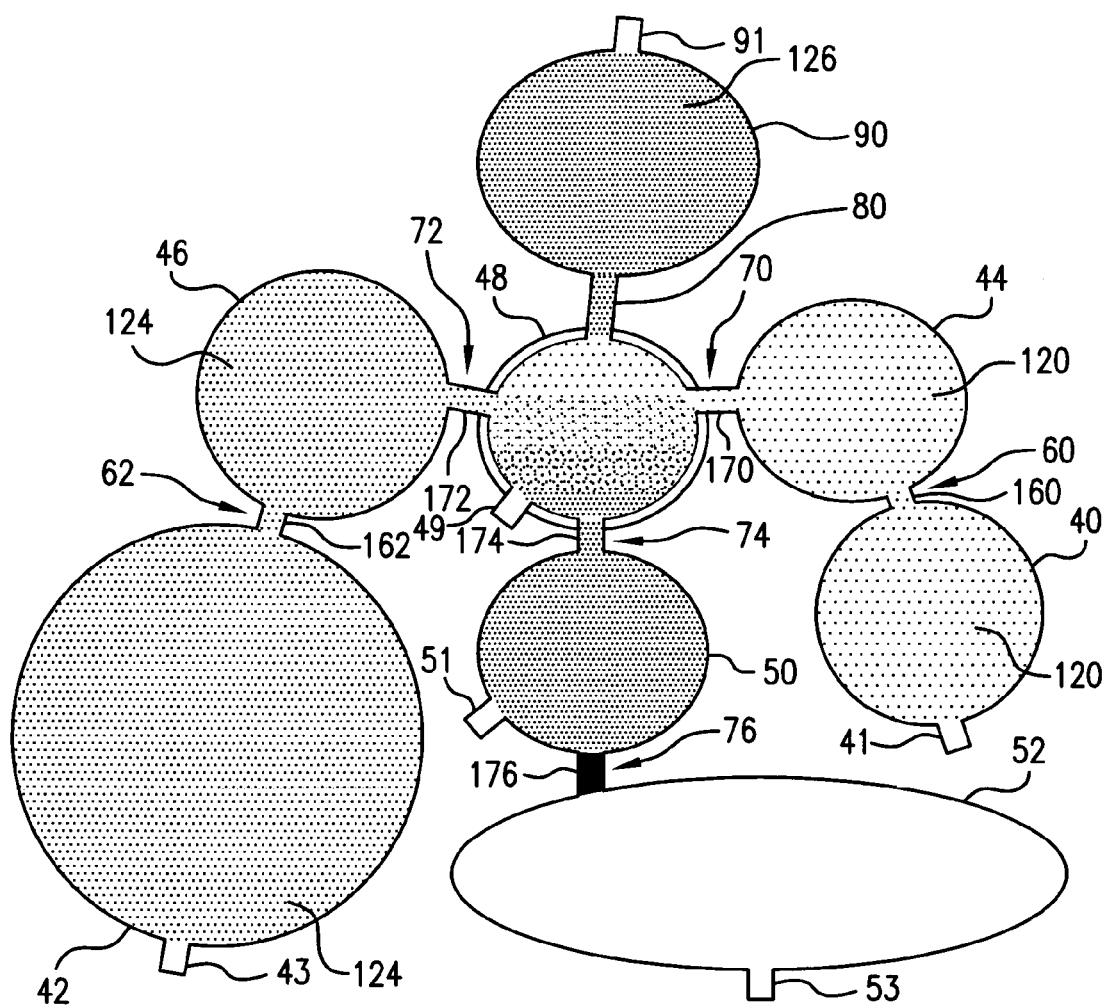

After a predetermined amount of time, solute bridge valve 70 provided in the fluid processing passageway 170 between intermediate retainment region 44 and reaction retainment region 48 can also begin to dissolve, melt, or otherwise change in volume such that reagent 120 flows from reagent retainment region 40 through intermediate retainment region 44 and into the reaction retainment region 48, as shown in FIG. 4H. The relative cross-sectional flow areas of the various flow passages connecting retainment regions as well as the amount of material provided in the solute bridge valves within the flow passages can be varied in order to control the amount of time it takes for the reagents and other fluids within the retainment regions to move from one retainment region to the next, thereby providing a control of the fluid handling steps.

Figure 4I:
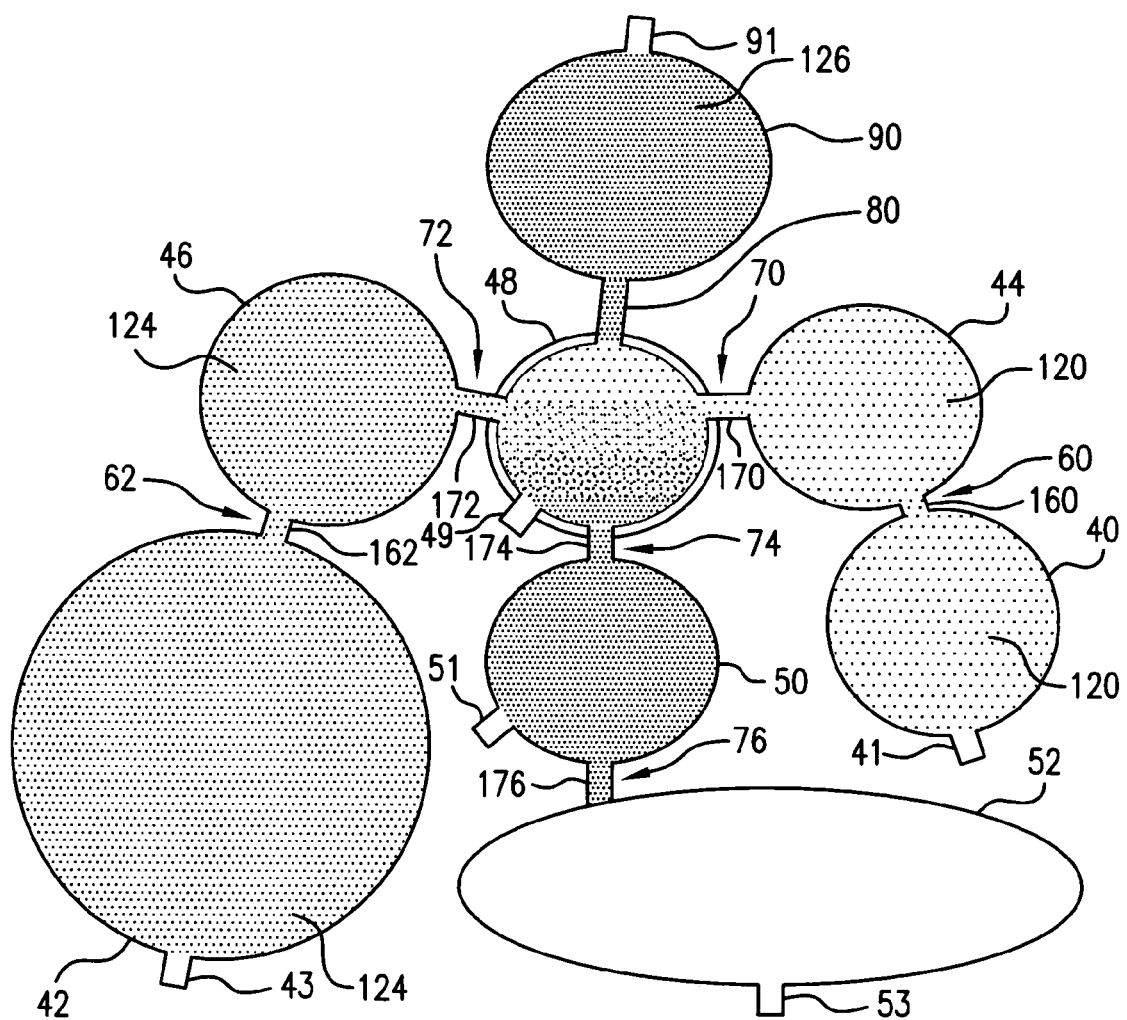
Figure 4J:
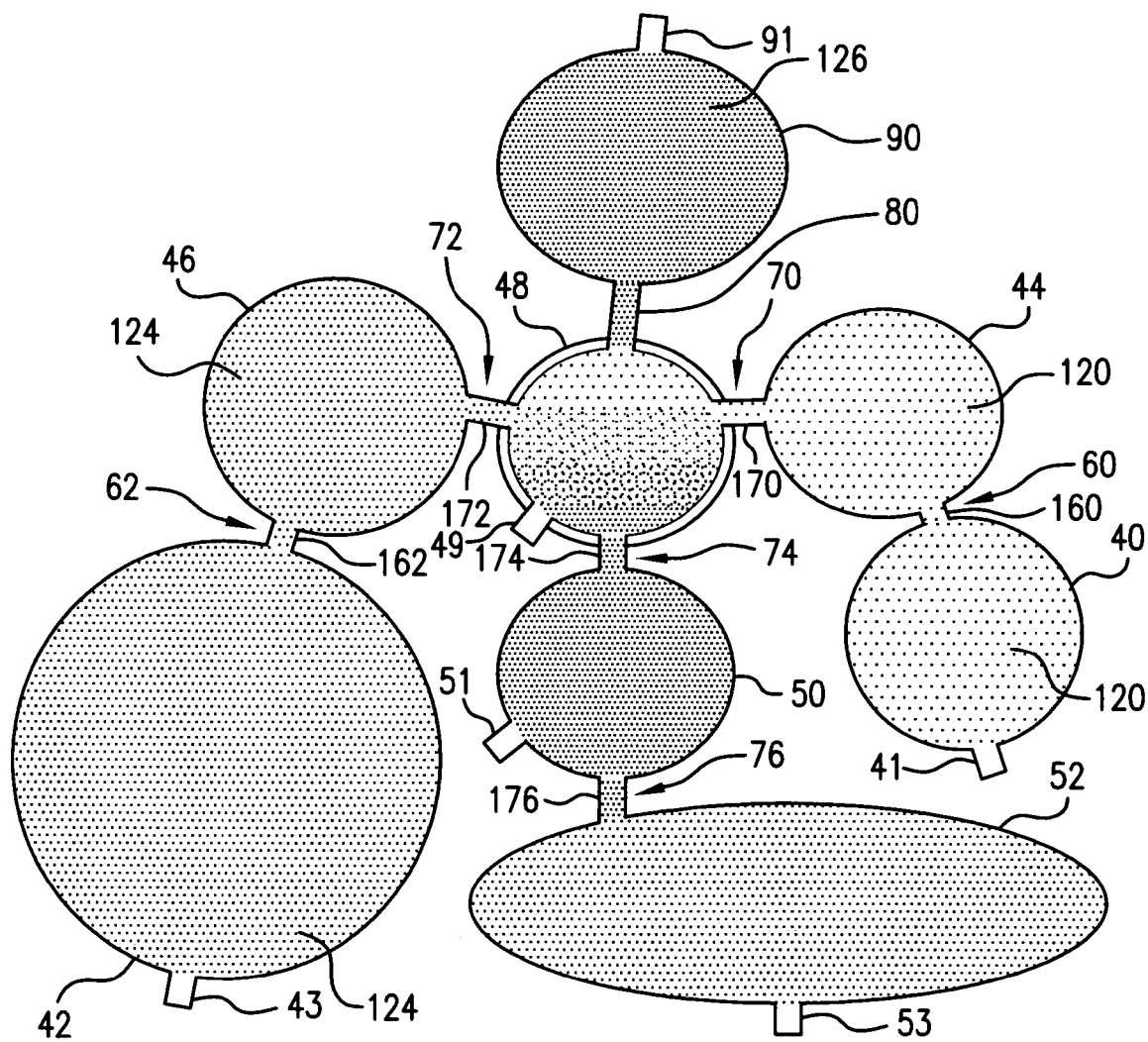

After more time has passed, solute bridge valve 76 in flow passage 176 leading to a second waste retainment region 52 can begin to dissolve, melt, or otherwise change in volume such that fluid can flow from waste retainment region 50 into second waste retainment region 52, as shown in FIGS. 4I and 4J. This flow can cause more of the reagents and sample to flow from regions 44, 46 and 90 into reaction region 48. Pressure can be relieved via vent 49 and/or vent 91.

In an alternative embodiment, as exemplified in FIG. 3 and FIGS. 5A-5J, the diagnostic device can comprise a set of retainment regions and microchannels corresponding to the retainment regions and microchannels of the embodiment exemplified in FIGS. 2 and 4A-4J, but with the solute bridge valves 72a, 70a, 74a, and 76a being aligned so that they can be formed as a single, extended length of solute bridge valve material. The length of the solute bridge valve material can include different portions of different respective composition. The process by which mixing of buffer and/or reagent from retainment regions 40a, 42a, and sample from sample retainment region 90a is controlled automatically corresponds with the process described above for the embodiment shown in FIG. 2 and FIGS. 4A-4J.

Figure 5A:
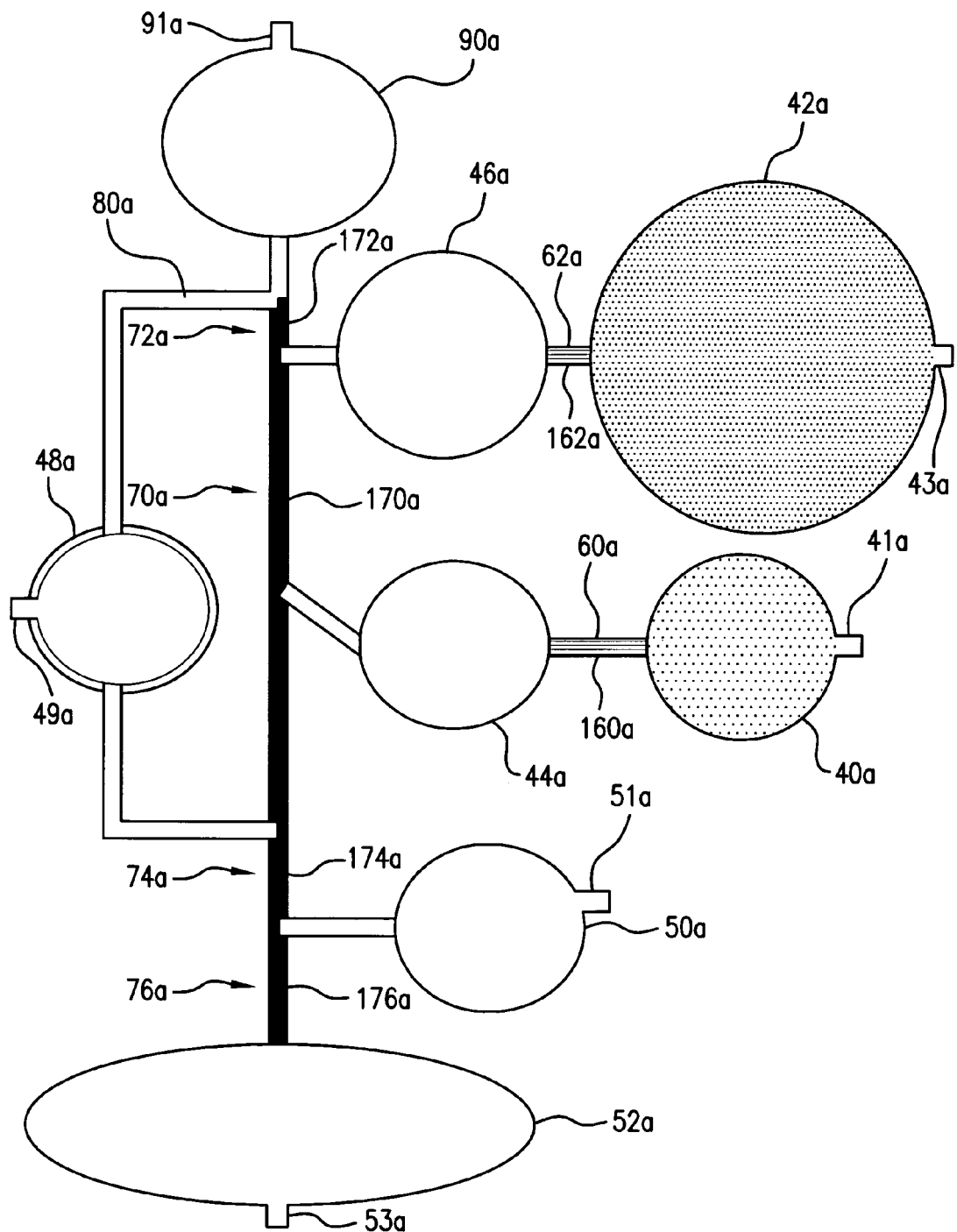
Figure 5B:
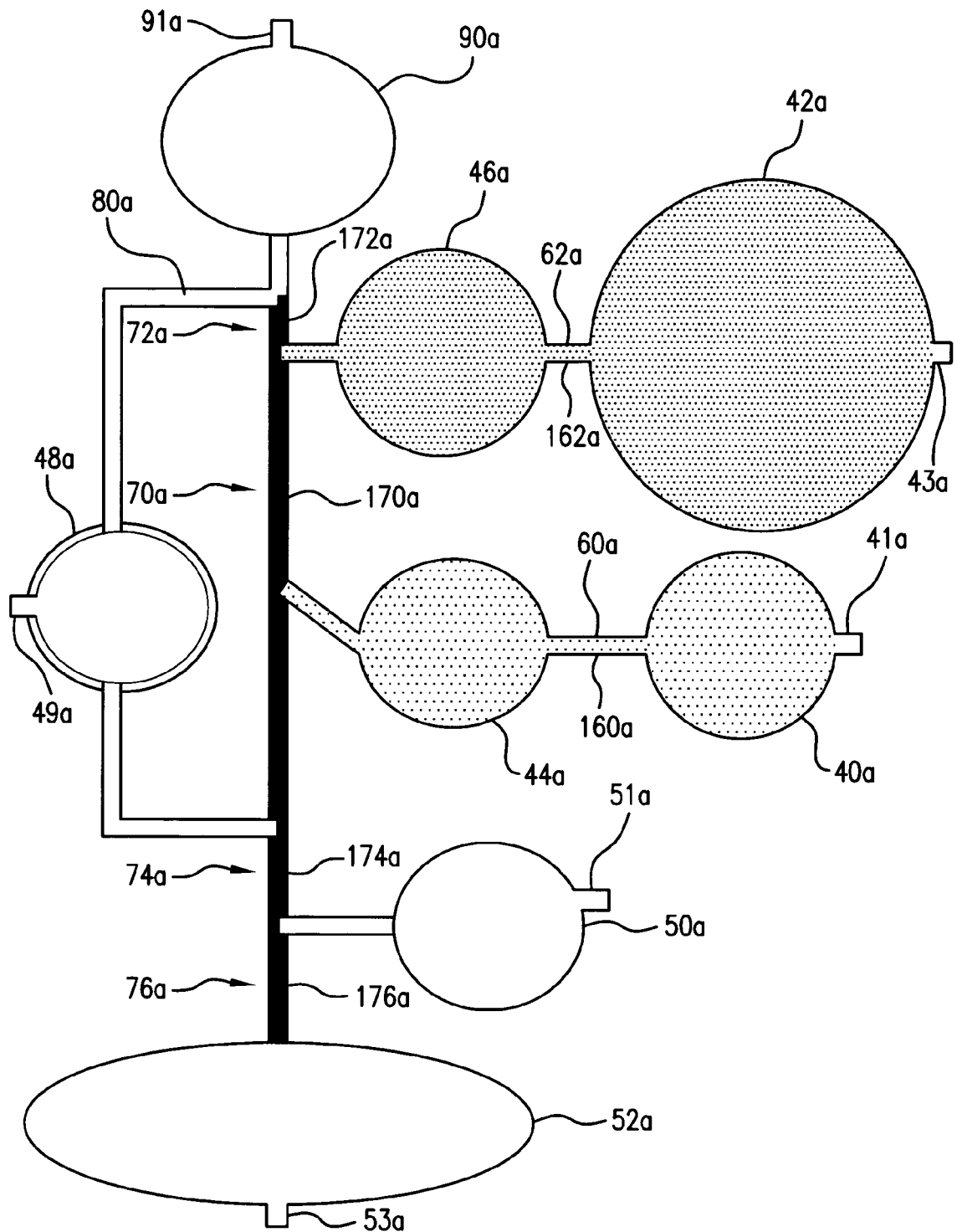
Figure 5C:
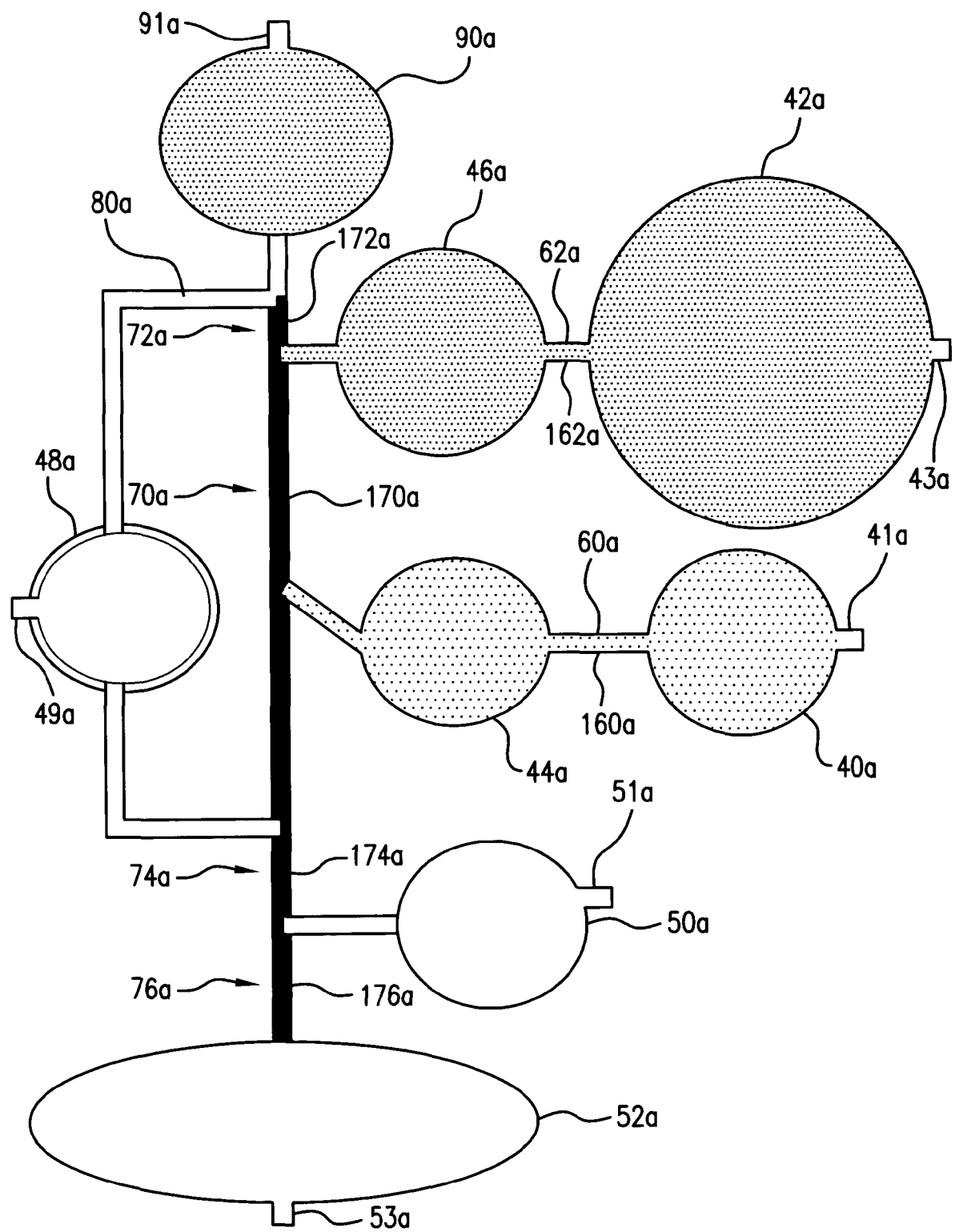
Figure 5D:
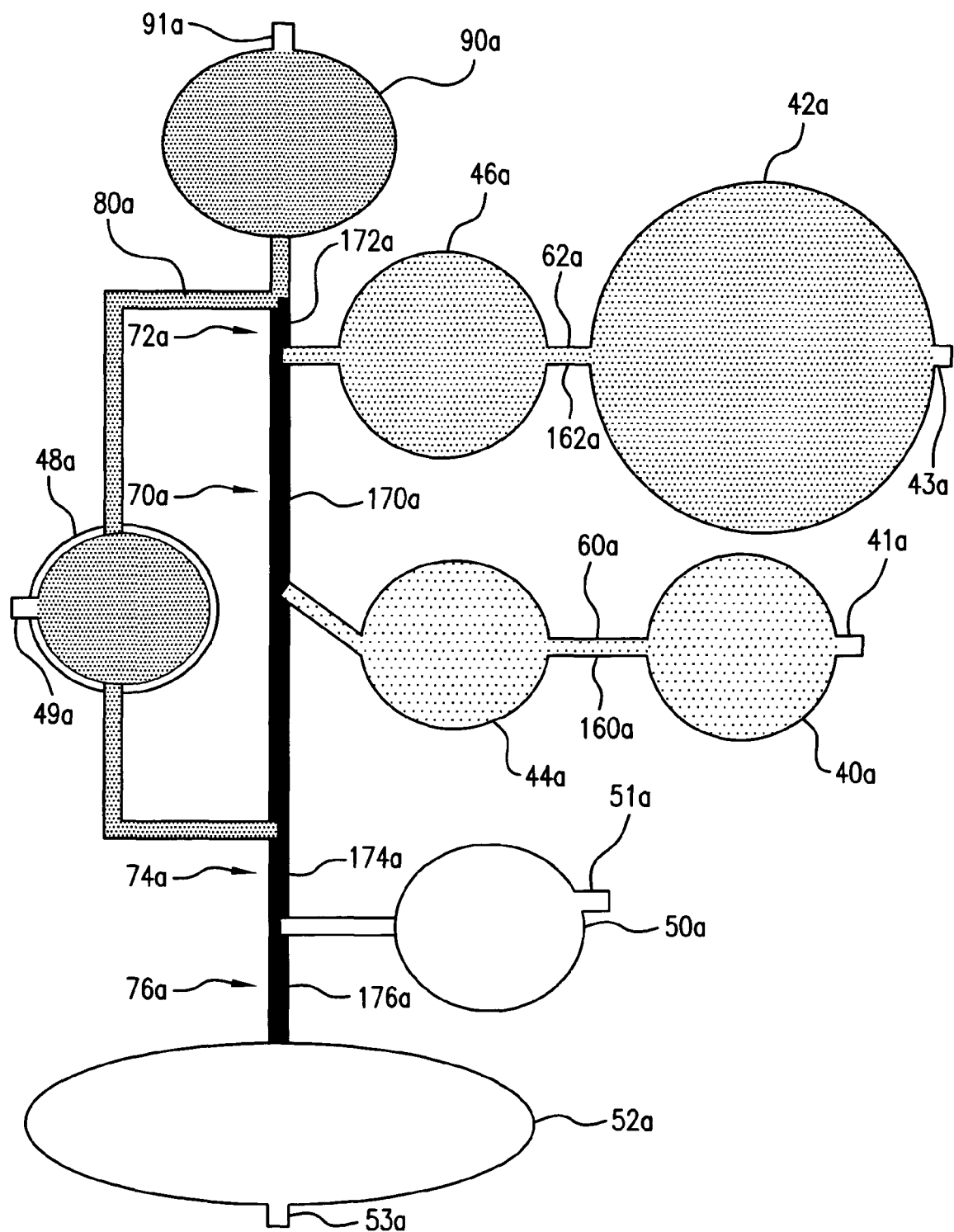
Figure 5E:
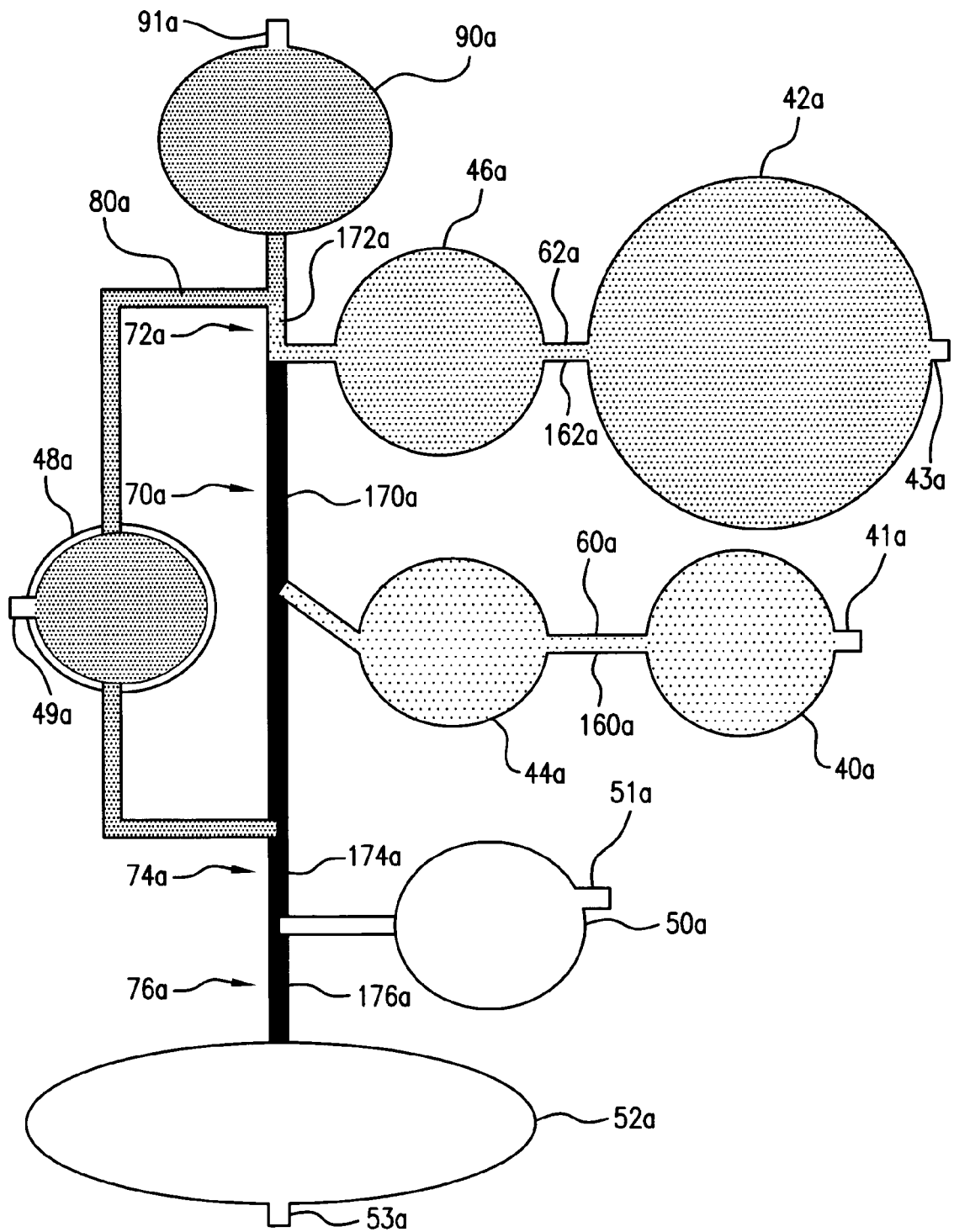
Figure 5F:
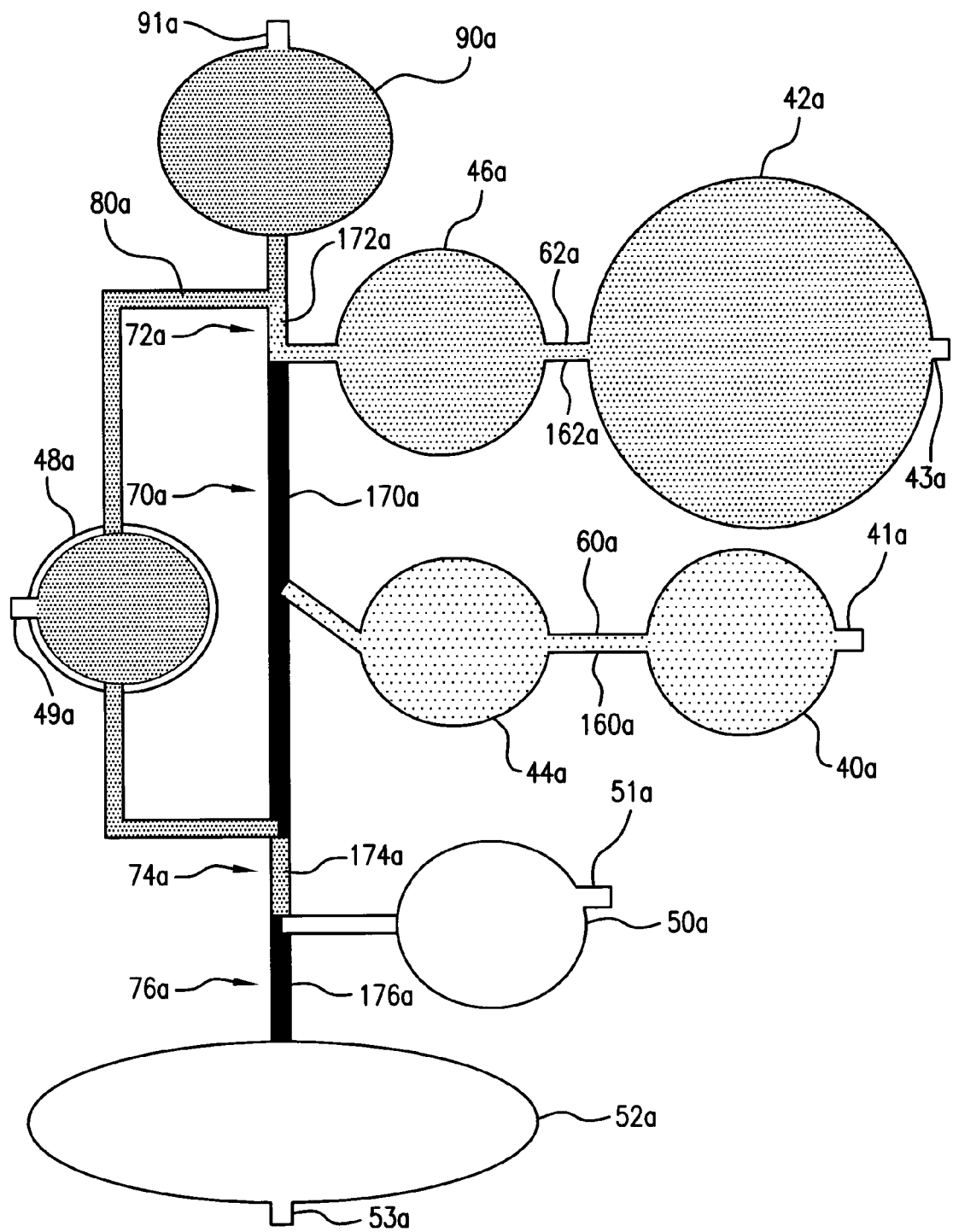
Figure 5G:
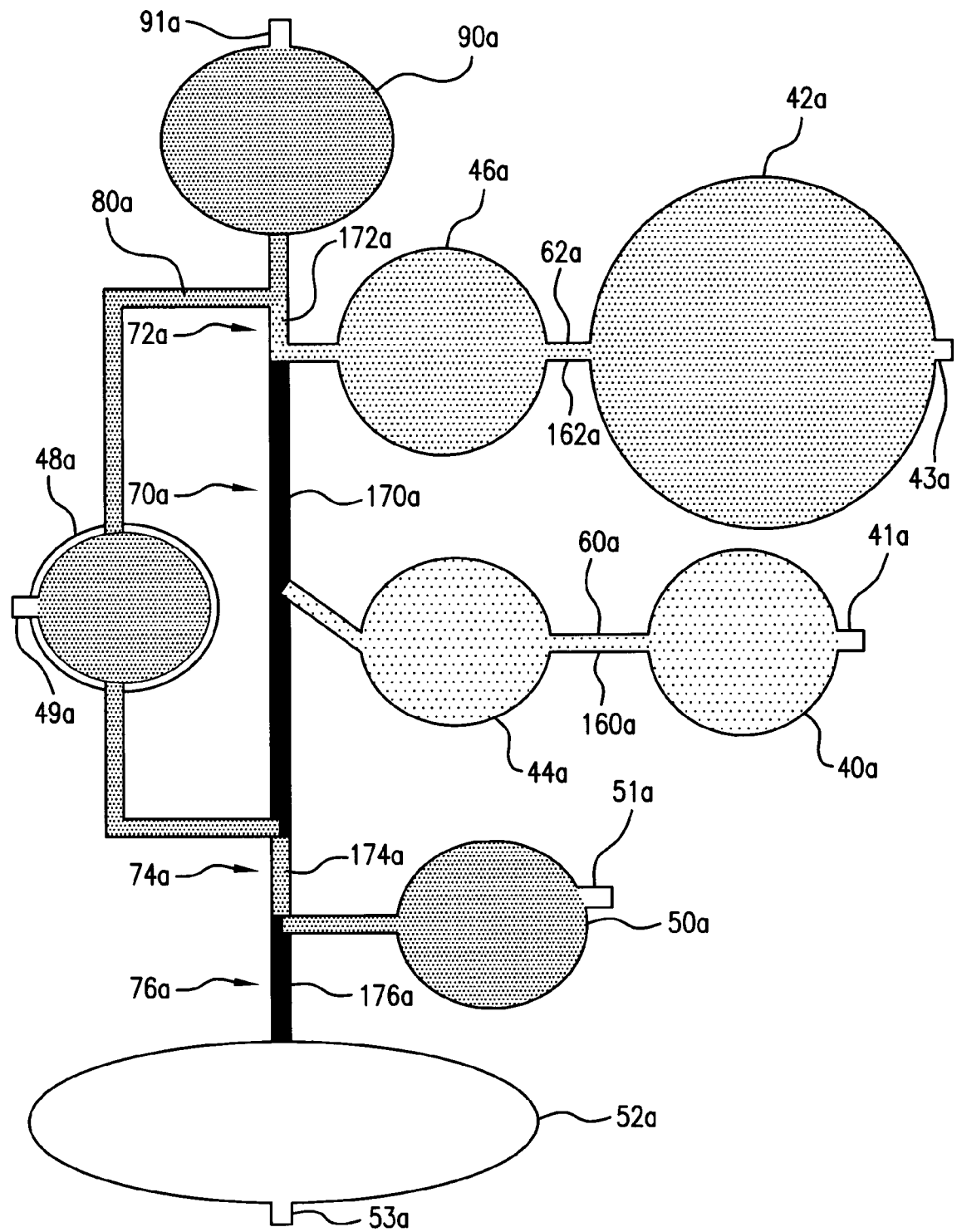
Figure 5H:
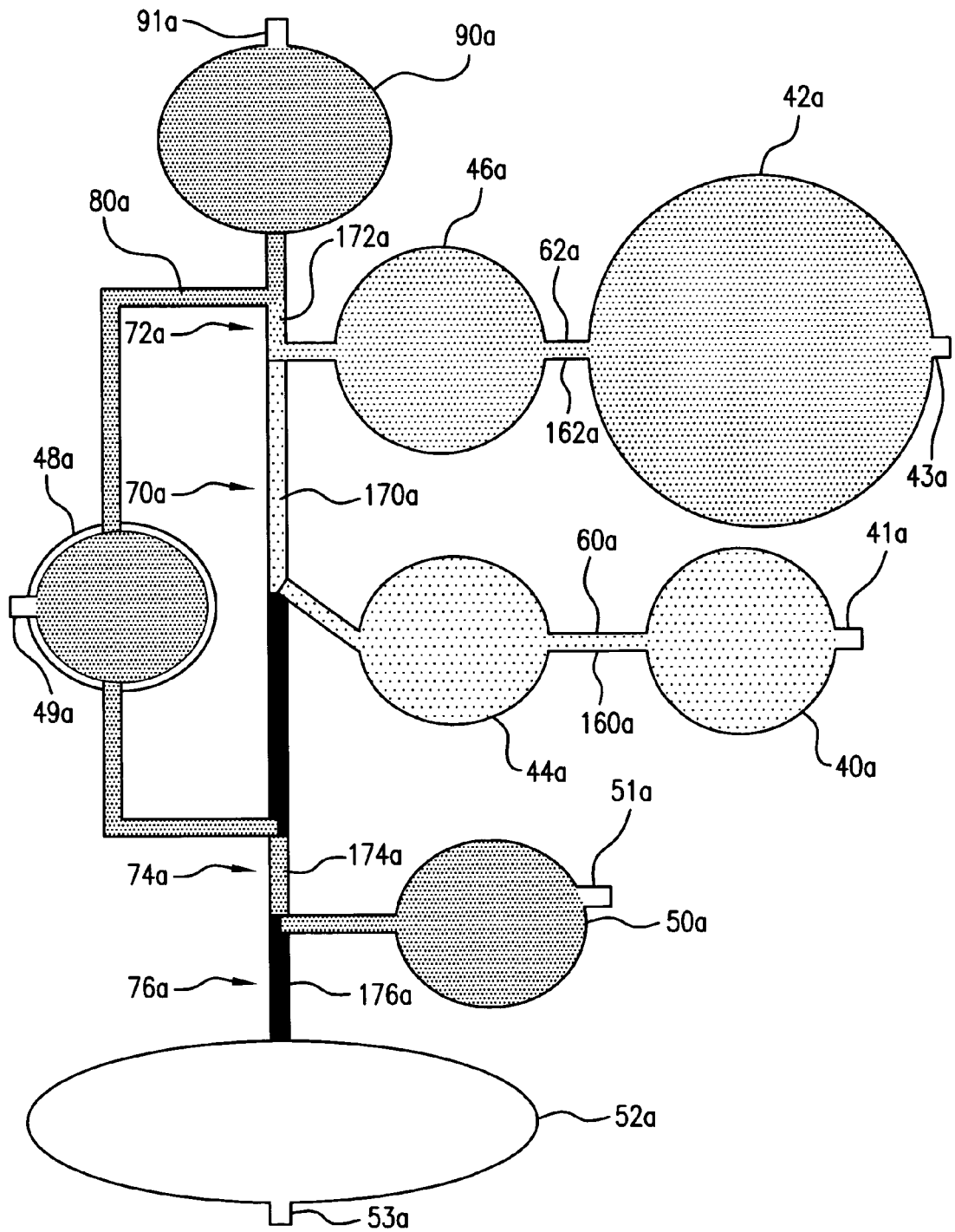
Figure 5I:
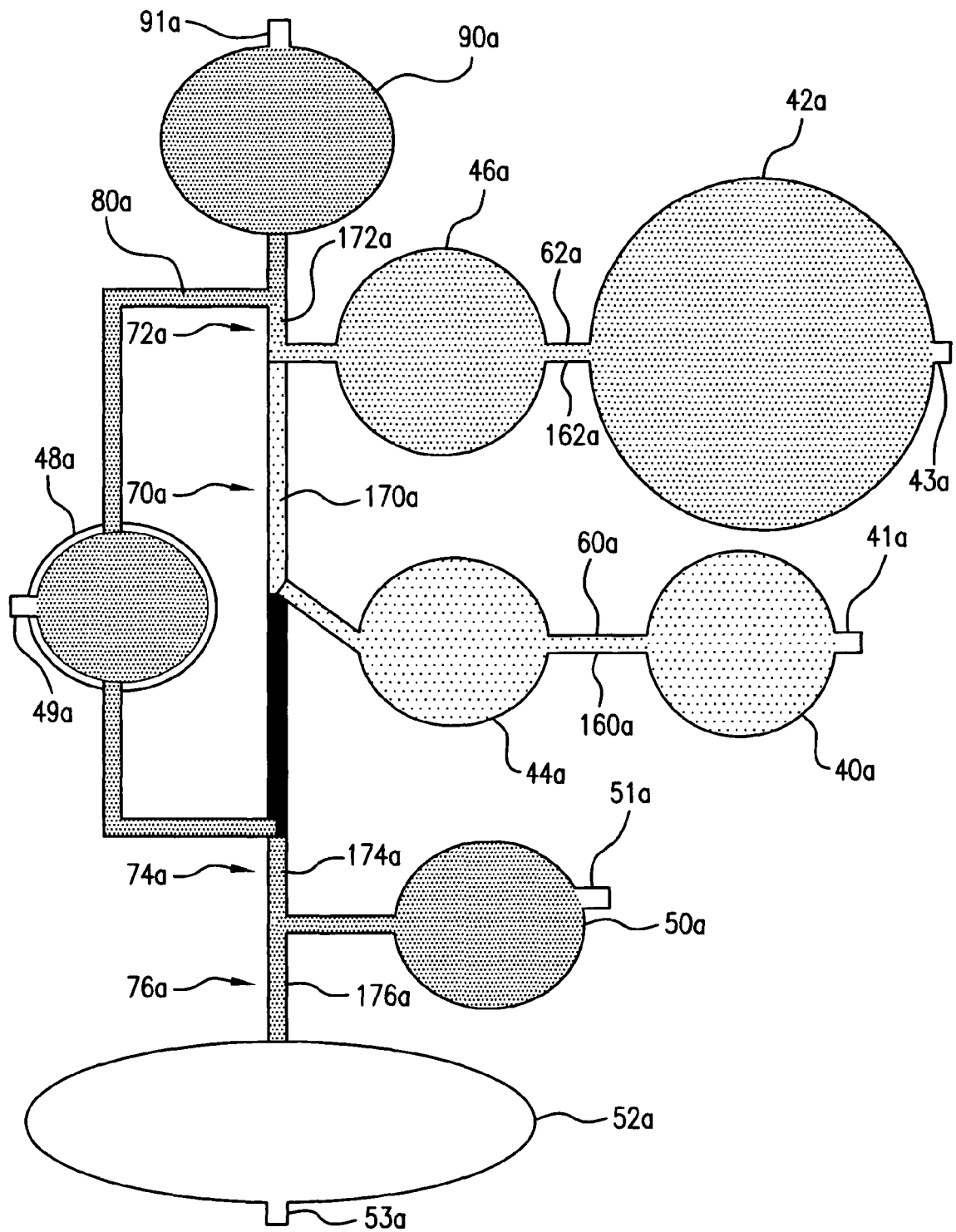
Figure 5J:
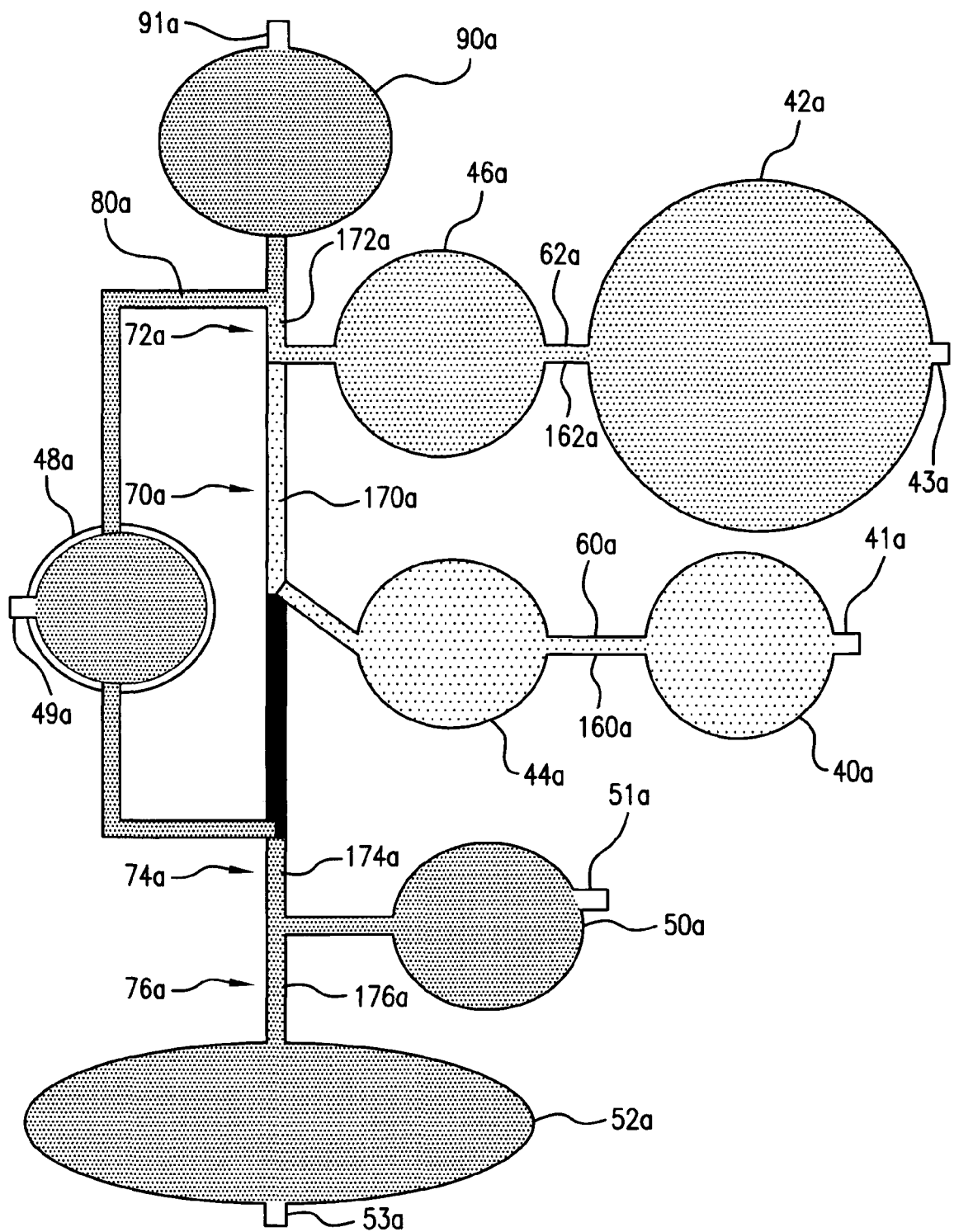

A sample solution can be added to sample retainment region 90a, and supplied to a reaction retainment region 48a through fluid processing passageway 80a, as shown in FIGS. 5C and 5D. Solutions, such as reagents and/or wash buffers, can be dispensed from retainment regions 40a, 42a by pressing on the clear layer of film or other flexible covering over the retainment regions to cause pressure-actuated valves 60a, 62a in fluid processing passageways 160a, 162a to burst and allow the solutions to move into intermediate retainment regions 44a, 46a. Solution from intermediate retainment region 46a then begins to act on solute bridge valve 72a in fluid processing passageway 172a, opening up a passageway for the solution to enter fluid processing passageway 80a and reaction retainment region 48a, as shown in FIGS. 5D, 5E, 5F and 5G. FIG. 5H illustrates solution from retainment region 44a dissolving, or otherwise reducing the volume of solute bridge valve 70a in fluid processing passageway 170a. Solute bridge valve 74a in fluid processing passageway 174a has also dissolved in FIG. 5H to allow solution from the reaction retainment region 48a to pass to a waste retainment region 50a. As described above with regard to the embodiment of FIG. 2, the flow of solution from reaction retainment region 48a to the waste retainment region 50a creates a suction that draws more solution from retainment region 46a through fluid processing passageway 172a and fluid processing passageway 80a into the reaction retainment region 48a, as shown in FIG. 5I. Solute bridge valve 76a in fluid processing passageway 176a then dissolves, allowing solution to flow to waste retainment region 52a, and creating suction that draws solution from retainment region 44a into reaction retainment region 48a, as well as drawing additional solution from retainment region 46a and additional sample from retainment region 90a, as shown in FIG. 5J. For example, vents 41 and 43 are needed in 40 and 42, respectively, (FIG. 4A) in order to allow 120 and 124 to flow into 44 and 46, respectively. Likewise, vent 91 is needed in communication with region 90. A vent 49 can be provided in communication with regions 48 (FIG. 4D) such that 120, 124 and 126 can flow into it. Without a vent, the air trapped in 48 can prevent any inflow of liquid. The same can apply to regions 50 and 52.

The arrangement of retainment regions, fluid processing passageways and valves of the various embodiments exemplified in FIG. 3 provides for ease of manufacturing. As shown in FIG. 3 and FIGS. 5A-5J, the solute bridge valves 70a, 72a, 74a, and 76a can be aligned with each other such that the solute bridge valves can be formed as one length of material. The diagnostic device 130 shown in FIG. 6 exemplifies an embodiment wherein the solute bridge valves are formed as one extended length of solute bridge valve material 270 in a substrate 134 separate from a substrate 132, within which various retainment regions such as retainment regions 140 and 142 are formed. When the two substrates 132 and 134 are sandwiched together to form the device 130, the length of solute bridge valve material 270 can connect to fluid processing passageways 260, 262, 264, and 266, as shown in FIG. 7, which passageways are connected to various retainment regions. As illustrated in FIG. 7, even if the two substrates 132, 134 are not perfectly aligned, the length of solute bridge valve material 270 will still connect with the fluid processing passageways 260, 262, 264, and 266. FIG. 8 illustrates a situation wherein separate substrates for solute bridge valves 370, 372 and fluid processing passageways 360, 362, 364, and 366, are not perfectly aligned when forming a device as exemplified in the embodiment of FIG. 2. In this situation the solute bridge valves 370, 372 would not connect to fluid processing passageways 360, 362, and 364, 366.

Referring to FIG. 9, and according to various embodiments, retainment regions 444, 446, and 448 can be formed in a substrate 440, with retainment region 444 interconnected with retainment region 448 through a fluid processing passageway 470, and retainment region 446 interconnected with retainment region 448 through a fluid processing passageway 472. Solution such as reagents and/or wash buffers can be retained in the retainment regions 444 and 446 by a flexible sheet of material 460 applied over the top surface of substrate 440 and adhered to the top surface by an adhesive layer 462. Pressure-actuated valves 470a, 472a can be positioned in the fluid processing passageways 470, 472 such that pressure applied to the solutions in retainment regions 444, 446 by pressing down on the flexible sheet 460 over the respective retainment regions will dispense the solutions through passages 470, 472 into the retainment region 448. A barrier 450 can define an inner retainment region 430 and provide an automatically controlled interaction between the solution or solutions 442 in the retainment region 448 and a solution retained in the inner retainment region 430. If desired, the barrier 450 can be formed from a composite material, for example, a polyethylene glycol material or polyethylene glycol derivative material, and a catalyst. The composite material can be adapted to gradually dissolve and thereby control the interaction between the solution or solutions 442 in outer retainment region 448 and a solution retained in the inner retainment region 430.

According to various embodiments, and as exemplified by the embodiment shown in FIG. 10, a device can be provided that comprises a substrate 540 having a retainment region 542 formed in the substrate and covered by a sheet 560 that is adhered to the top surface of the substrate 540 by an adhesive 562. An inner retainment region 530 can be defined within the retainment region 542 by a barrier 550 that can act as a fluid flow modulator between a solution in the outer retainment region 542 and a solution or material in the inner retainment region 530. The barrier 550 can comprise a portion 552 made from a soluble material, and a portion 554 made from an insoluble material to provide a further degree of automatic control of the interaction between the solutions or other ingredients in retainment regions 542 and 530. Sample and/or reagents can be injected into retainment regions 542 to initiate a process. A septum (not shown) can be provided as an injection port or injection can occur, for example, by piercing a cover layer.

According to various embodiments, and as exemplified in the embodiment shown in FIG. 11, the substrate 700 can be provided with a retainment region 740 connected through a fluid processing passageway 770 and having a pressure-actuated valve 772 to a second retainment region 742. Similarly, another retainment region 740a can be connected through a passage 770a having a pressure actuated valve 772a to the second retainment region 742. A star-shaped or otherwise polygonal retainment region 730 can be defined inside of the second retainment region 742 by a barrier 750. All of the retainment regions can be covered by a sheet 760 adhered to the top surface of substrate 700 by an adhesive layer 762. A solution within retainment region 740 can be dispensed through fluid processing passageway 770 by applying pressure to the sheet 760 over the retainment region 740 to force the liquid past the pressure-actuated valve 772 into the second retainment region 742. The barrier 750 can comprise a composite material, for example, a polyethylene glycol sequestering material and a magnesium ion catalyst. The composite material can be adapted to gradually dissolve or melt in response to a stimulus such as a characteristic or property of a solution that has been introduced into the second retainment region 742. The result is an automatically controlled interaction between the solution in second retainment region 742 and the solution in retainment region 730. In an exemplary device, channels could interconnect with each respective point of the star shape shown.

According to various embodiments, further control of the fluid handling steps can be provided by including various solute structures within the fluid processing passageways and/or the retainment regions. The solute structures can be selected to dissolve over a finite amount of time and change the flow properties of the fluidic circuit. As an example, raised structures (such as pillars of different aspect ratios) made from solute material (such as PEG) can be fabricated by photolithography inside the various retainment regions, retainment regions, and/or fluid processing passageways. The incorporation of these structures can cause the flow paths to have different capillarity and can cause capillary suction pressures of different magnitudes in different parts of the fluidic circuit. The structures can also introduce additional flow resistance, with a variation in the flow resistance depending on the dissolution of the solute structures.

In one example, an array of pillars made of PEG could be fabricated inside of the waste retainment regions 50, 52, in the embodiment of FIG. 2, or 50a, 52a in the embodiment of FIG. 3, which could, for example, cause higher suction pressure in waste retainment region 50 or 50a by capillary action as compared to the suction pressure in reaction retainment region 48 or 48a. Over time, the solute structures within waste retainment region 50 or 50a would dissolve in the liquid, which could result in the capillary suction pressure into retainment region 50 or 50a reducing over time. Subsequent dissolution of a solute within fluid processing passageway 176 between waste retainment region 50 and waste retainment region 52, for example, could then result in the liquid in waste retainment region 50 being pulled into waste retainment region 52. The pulling can be as a result of a larger capillary suction pressure in waste retainment region 52 caused by solute structures in retainment region 52. The PEG cannot operate until 74 and 76 in FIG. 2 and 170a, 172a and 174a in FIG. 3 are open. The flow of 120, 125 and 126 in FIG. 2 into 44, 46, and 48, respectively, relies on capillary effect alone, and does not rely on vacuum created by the PEG in 50 or 52 because neither 76 nor 74 are open. PEG can facilitate fluid flow from 48 into 50 and/or 52 without a vent. The flow of 120, 124 or 126 into 44, 46, or 48, respectively, relies on capillary effect that requires air vents to prevent pressure build up.

According to various embodiments, side products in nucleic acid amplification methods can be reduced by using a barrier as described herein, in a fluid processing device. The yield of a desired product in a nucleic acid amplification method can be improved. Many reaction components can be stored together in the same chamber or same processing pathway of a device, thus enabling miniaturized designs and packaging. According to various embodiments, the shelf life of reaction components and reactant mixtures can be increased. Furthermore, the barriers, flow modulators, and valves described herein can be incorporated in PCR devices, in the TaqMan product lines available from Applied Biosystems, Foster City, Calif., in microfluidic devices in which isothermal nucleic acid amplification is performed, in the devices described in U.S. patent application Ser. Nos. 10/808,228 and 10/808,229, both of which were filed on Mar. 24, 2004, which are incorporated herein in their entireties by reference, and in the devices described in U.S. Patent Application Publication No. US2004/0132051 A1, to Andersen, entitled "Mg-Mediated Hot Start Biochemical Reactions," published Jul. 8, 2004, which is incorporated herein in its entirety by reference. The barriers, flow modulators, and valves described herein can also be incorporated into portable, handheld microassay devices. U.S. Pat. No. 5,643,764, issued Jul. 1, 1997, to Kosak et al., is also incorporated herein in its entirety by reference.

Other embodiments of the present teachings will be apparent to those skilled in the art from consideration of the present specification and practice of the present teachings disclosed herein. It is intended that the present specification and examples be considered as exemplary only.

What is claimed is:
1. A microfluidic processing device comprising:
a substrate;
a plurality of microfluidic fluid retainment regions formed in or on the substrate, comprising at least a first fluid retainment region and a second fluid retainment region;
at least one microfluidic fluid flow passageway located between the first fluid retainment region and the second fluid retainment region; and
a dissolvable fluid flow modulator located in the at least one microfluidic fluid flow passageway at least partially separating the first fluid retainment region from the sec- ond fluid retainment region, wherein said fluid flow modulator is a composite comprising at least:
a dissolvable first component, wherein the first component is a dissolvable sequestering material, and wherein the first component comprises at least one of a polyethylene glycol material, a dissolvable organic compound, a polysaccharide, and a cellulose derivative; and
a second component comprising at least one reaction component for a desired reaction,
wherein the dissolvable first component is configured to dissolve to release the second component for the desired reaction,
wherein the second component is encapsulated by the first component, the second component is embedded by the first component; the second component is uniformly dispersed throughout the first component, the second component is non-uniformly dispersed throughout the first component, or a combination thereof, and
wherein the second component comprises at least one of an enzyme, a catalyst, an oligonucleotide, and their salts.

2. The microfluidic processing device of claim 1, wherein the fluid flow modulator completely separates the first fluid retainment region from fluid communication with the second fluid retainment region.

3. The microfluidic processing device of claim 1, further comprising:
at least one additional fluid retainment region;
at least one fluid processing passageway; and
at least one valve comprising one or more of a pressure-actuatable valve and a heat-actuatable valve arranged in the at least one fluid processing passageway, wherein the at least one fluid processing passageway is in fluid communication with the at least one additional fluid retainment region and at least one of the plurality of fluid retainment regions.

4. The microfluidic processing device of claim 1, wherein at least the first and the second fluid retainment regions are each in fluid communication with the at least one microfluidic fluid flow passageway, and the fluid flow modulator comprises a series of fluid flow modulators arranged in sequence in the at least one microfluidic fluid flow passageway and adapted to open to sequentially form, or increase in size, a fluid communication between the at least two fluid retainment regions.

5. The microfluidic processing device of claim 1, wherein the at least one of the first fluid retainment region and the second fluid retainment region comprises two terminals each terminal comprising a metallic material, and the fluid flow modulator comprises an electrolyte-forming material.

6. The microfluidic processing device of claim 1, wherein the second component includes a dissolvable material capable of dissolving when contacted with water at room temperature.

7. The microfluidic processing device claim 1, wherein the first component comprises at least one of a dissolvable porous material, a dissolvable porous scaffold material, a biodegradable polymer scaffold material, a dissolvable gel or gelatin scaffold material, a water soluble polymer, or a combination thereof, and the second components comprises at least one of an ion, an initiator, a promoter, a reactant, a reagent, a cofactor, or a combination thereof.

8. The microfluidic processing device of claim 1, wherein the first component is at least one of a dissolvable porous polymer, a dissolvable scaffold, a biodegradable scaffold, or combinations thereof.

9. The microfluidic processing device of claim 1, wherein the second component is at least one of a reactant, a reagent, an initiator, a promoter, a cofactor, or combinations thereof.

* * * * *